(12) United States Patent
Tully et al.

(10) Patent No.: US 9,022,207 B2
(45) Date of Patent: May 5, 2015

(54) CONVEYOR SYSTEM BRIDGE

(71) Applicant: GYRE Innovations LP, York, PA (US)

(72) Inventors: Clay Tully, Hummelstown, PA (US);
Stephen Mettee, II, Red Lion, PA (US);
Stephen W. Tansey, York, PA (US)

(73) Assignee: GYRE Innovations LP, York, PA (US)

( * ) Notice: Subject to any disclaimer, the term of this patent is extended or adjusted under 35 U.S.C. 154(b) by 27 days.

(21) Appl. No.: 14/141,878

(22) Filed: Dec. 27, 2013

(65) Prior Publication Data

US 2014/0183002 A1    Jul. 3, 2014

Related U.S. Application Data

(60) Provisional application No. 61/746,601, filed on Dec. 28, 2012.

(51) Int. Cl.

| | |
|---|---|
| *B65G 13/075* | (2006.01) |
| *B65G 47/66* | (2006.01) |
| *B65G 13/071* | (2006.01) |
| *B65G 39/02* | (2006.01) |
| *B65G 39/12* | (2006.01) |
| *B29C 47/00* | (2006.01) |
| *B29C 47/04* | (2006.01) |
| *B29C 47/12* | (2006.01) |
| *B29C 47/24* | (2006.01) |

(52) U.S. Cl.
CPC ......... *B65G 13/075* (2013.01); *Y10T 29/49826* (2015.01); *B65G 13/071* (2013.01); *B65G 39/02* (2013.01); *B65G 39/12* (2013.01); *B29C 47/0004* (2013.01); *B29C 47/0028* (2013.01); *B29C 47/003* (2013.01); *B29C 47/04* (2013.01); *B29C 47/122* (2013.01); *B29C 47/24* (2013.01); *B65G 47/66* (2013.01)

(58) Field of Classification Search
CPC .... B65G 13/075; B65G 13/071; B65G 47/66; B65G 39/02; B65G 39/12
USPC ........................................ 198/600, 790, 35 A
See application file for complete search history.

(56) References Cited

U.S. PATENT DOCUMENTS

| | | |
|---|---|---|
| 458,515 A | 8/1891 | Boyle |
| 1,030,479 A | 6/1912 | Ofstad |
| 1,843,062 A | 1/1932 | Bradley |
| 2,536,961 A | 1/1951 | Smith |
| 2,590,994 A | 4/1952 | McKay |
| 3,464,450 A | 9/1969 | Steffenini |

(Continued)

FOREIGN PATENT DOCUMENTS

| | | |
|---|---|---|
| DE | 3014608 A1 | 10/1981 |
| EP | 0290255 A2 | 11/1988 |

(Continued)

*Primary Examiner* — Mark A Deuble
(74) *Attorney, Agent, or Firm* — McNees Wallace & Nurick LLC

(57) ABSTRACT

A bridge for a conveyor system includes a bridge frame including a top support surface segment having a top support surface. The bridge frame further has first and second side walls extending downwardly away from the top support surface segment. Each side wall has a portion thereof with a radius of curvature substantially matching a corresponding conveyor roller. A portion of the first side wall extends toward and joins the second side wall, the second side wall further having a tail portion and a living hinge extending away from the tail portion.

20 Claims, 38 Drawing Sheets

(56) References Cited

U.S. PATENT DOCUMENTS

| | | |
|---|---|---|
| 3,465,489 A | 9/1969 | Monaghan |
| 4,157,194 A | 6/1979 | Takahashi |
| 4,288,208 A | 9/1981 | Kusters |
| 4,301,915 A | 11/1981 | Michalik et al. |
| 4,511,030 A | 4/1985 | Lem |
| 4,901,845 A | 2/1990 | Zorgiebel |
| 5,044,485 A | 9/1991 | Loder |
| 5,311,982 A | 5/1994 | Clopton |
| 5,344,001 A | 9/1994 | Kawaai et al. |
| 5,409,096 A | 4/1995 | Clopton |
| 5,496,956 A * | 3/1996 | Woodard et al. ........... 548/377.1 |
| 5,695,042 A | 12/1997 | van der Burgt et al. |
| 5,884,744 A | 3/1999 | Slodkowski |
| 6,269,939 B1 * | 8/2001 | Lapeyre et al. ............... 198/615 |
| 6,896,122 B2 | 5/2005 | Gambrell et al. |
| 7,083,041 B1 | 8/2006 | Foster |
| 7,523,820 B1 | 4/2009 | Wu et al. |
| 8,210,341 B2 | 7/2012 | Marshall et al. |
| 2005/0015986 A1 | 1/2005 | Stebnicki |
| 2009/0101381 A1 | 4/2009 | Perez |
| 2010/0108467 A1 | 5/2010 | Barreyre et al. |
| 2010/0230247 A1 * | 9/2010 | McKee ......................... 198/804 |
| 2011/0132725 A1 | 6/2011 | Marshall et al. |

FOREIGN PATENT DOCUMENTS

| | | |
|---|---|---|
| FR | 2676039 A1 | 11/1992 |
| GB | 1000809 A | 8/1965 |
| JP | S49109374 U | 9/1974 |
| JP | S5013316 B1 | 5/1975 |
| JP | H115624 A | 1/1999 |
| WO | 8403875 A1 | 10/1984 |
| WO | 9111012 A1 | 7/1991 |
| WO | 0009317 A1 | 2/2000 |
| WO | 0133938 A1 | 5/2001 |
| WO | 2005120805 A1 | 12/2005 |

\* cited by examiner

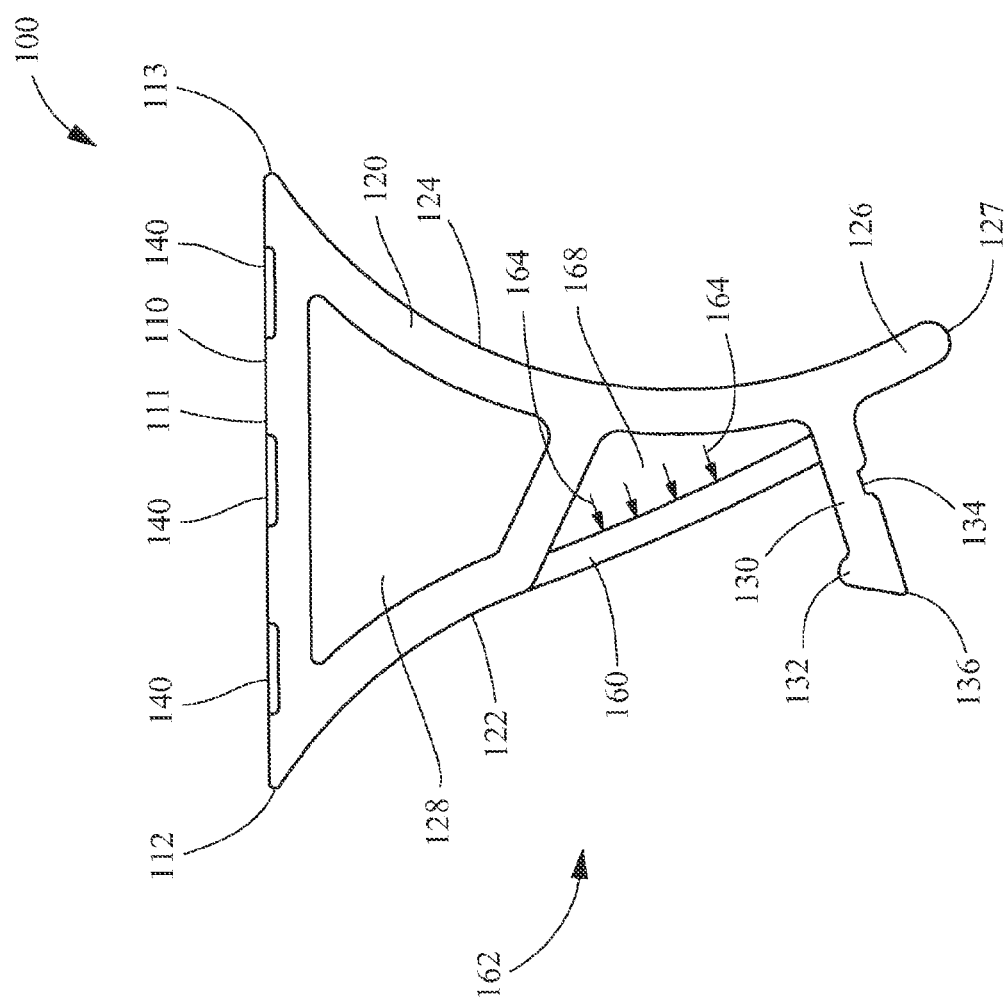

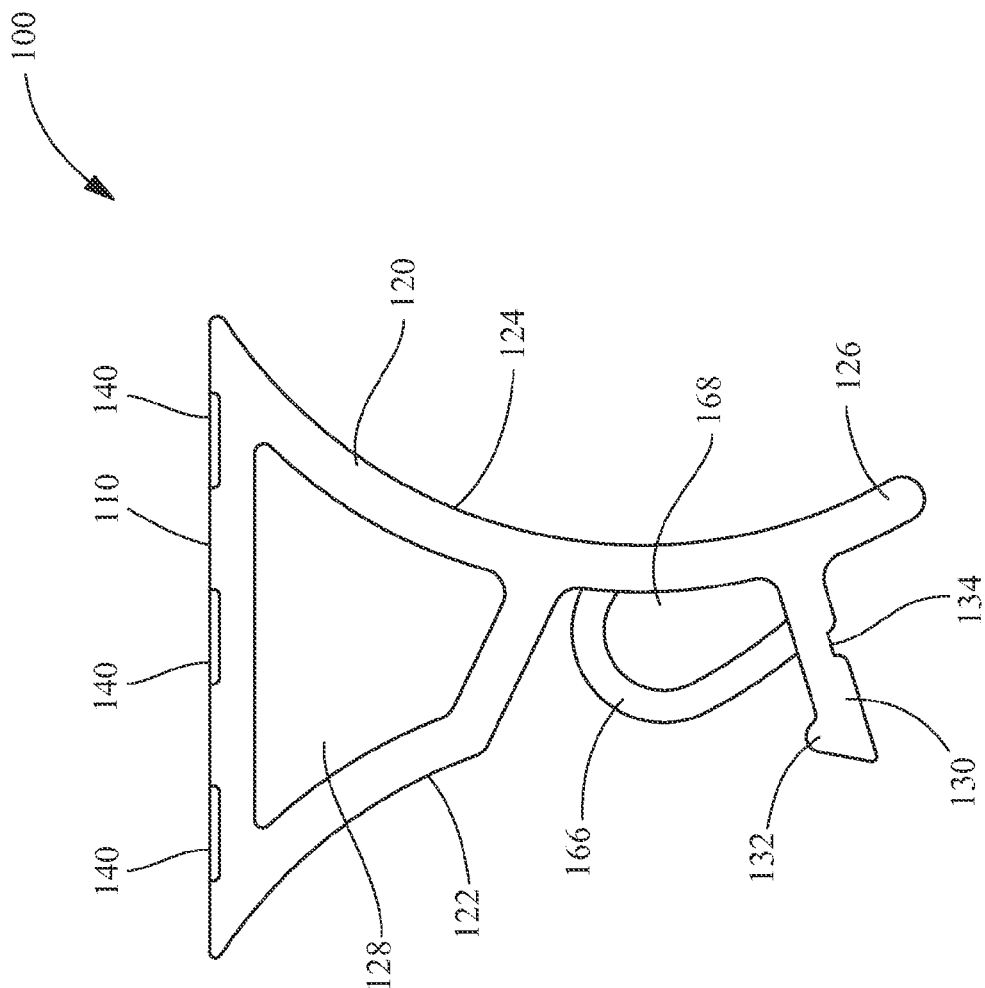

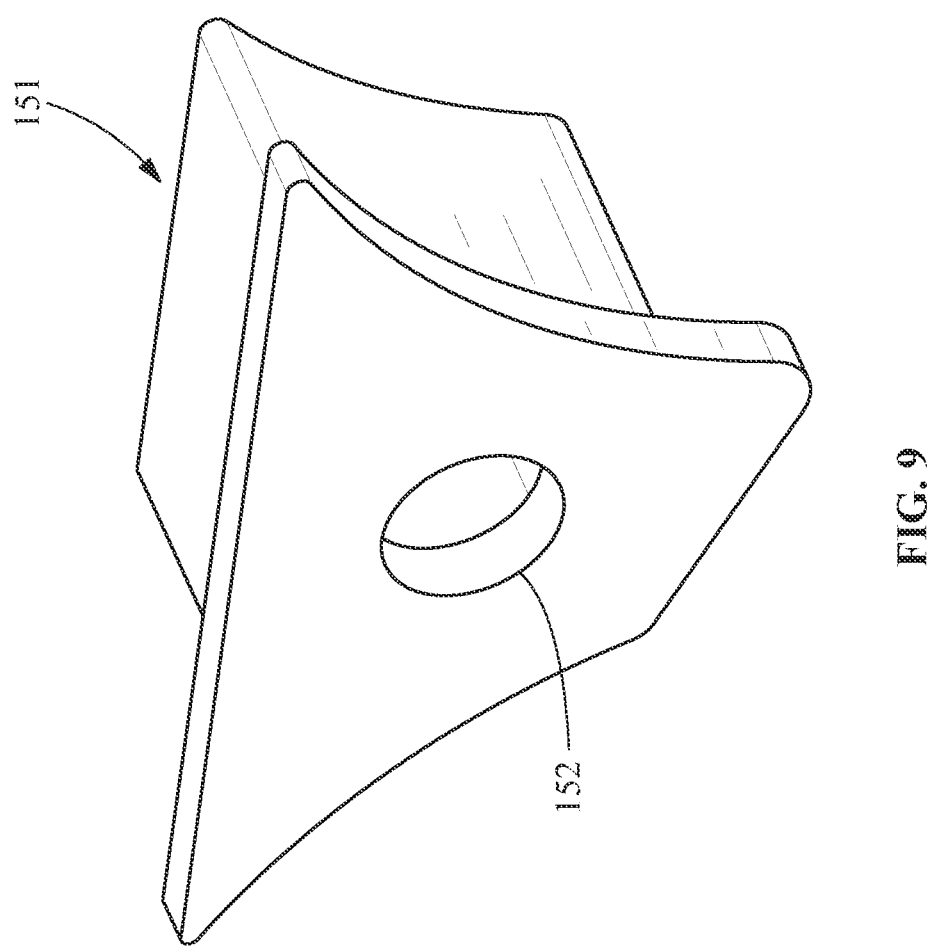

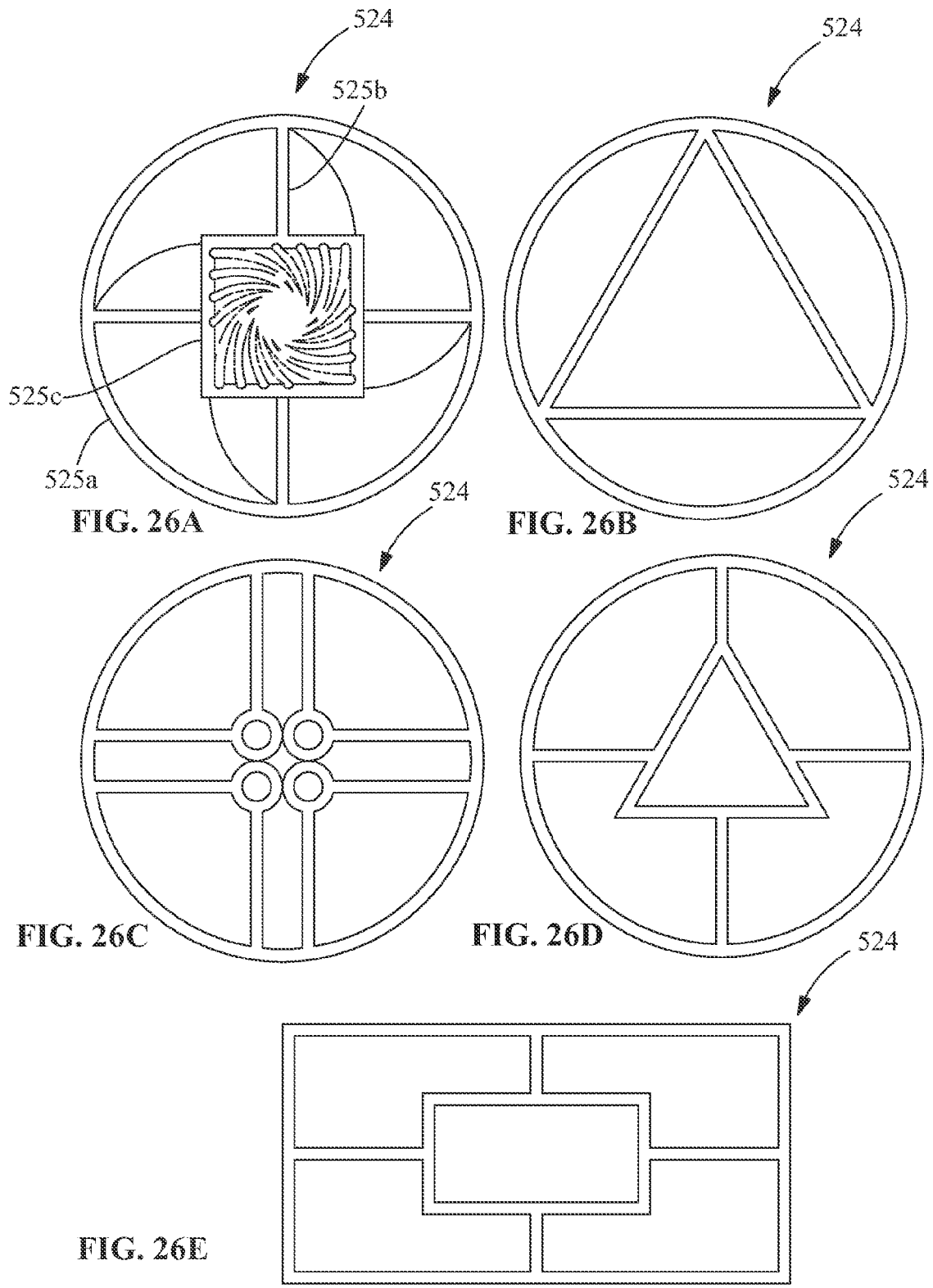

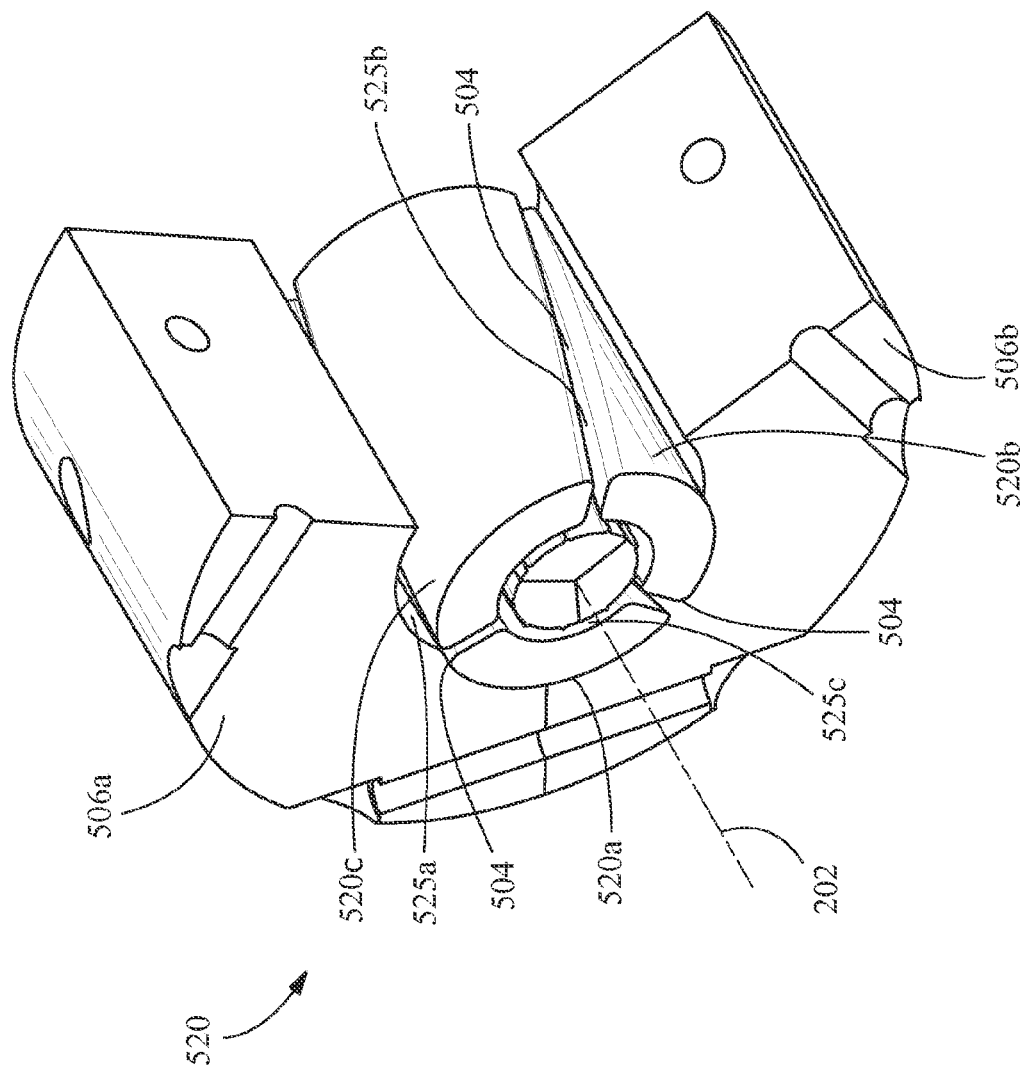

CONVEYOR SYSTEM BRIDGE

CROSS-REFERENCE TO RELATED APPLICATIONS

This application claims priority from and the benefit of U.S. Provisional Patent Application No. 61/746,601, filed Dec. 28, 2012, entitled "CONVEYOR SYSTEM", and which is hereby incorporated by reference.

BACKGROUND

The present invention is directed to a conveyor system and more particularly to a roller conveyor system and various sub-assemblies thereof.

Conveyor systems are widely used within industry to transport raw materials, components and/or finished products along an assembly line or otherwise within or between manufacturing facilities. One common conveyor system is a belt driven roller conveyor system. In belt-drive roller conveyor systems, a moving belt is raised or lowered beneath a set of elongated cylinders (i.e., rollers) to make or remove contact between the moving belt and the rollers. When the moving belt contacts the rollers, the rollers rotate in the opposite direction as the belt. As a result, a bale of goods or other article situated on top of the rollers is conveyed along the conveyor path as the rollers rotate in place. Other roller conveyor systems are known, including gravity and chain driven systems.

Unfortunately, numerous drawbacks are associated with conventional roller conveyor systems. Among those disadvantages include that the systems are often labor-intensive to install and maintain. Because they are often used continuously in a manufacturing or warehouse environment, roller conveyor systems can be subjected to long and rigorous operating conditions, resulting in wear and tear of components that require frequent maintenance. Maintenance of roller conveyor systems is often expensive, due in large part to the procurement and installation of spare parts, many of which are heavy and cumbersome.

Still other drawbacks not adequately addressed with known roller conveyor systems relate to safety. For example, individuals cannot cross a roller conveyor system without risk of falling onto the rollers, which can spin freely underfoot as one tries to walk across them. However, the alternative, walking entirely around the roller conveyor system, is not efficient, particularly since roller conveyor systems can extend for tens of yards or more.

It would be desirable in the art for a roller conveyor system without the above-mentioned drawbacks.

SUMMARY

One embodiment of the invention is directed to a bridge for a conveyor system including a bridge frame including a top support surface segment having a top support surface. The bridge frame further has first and second side walls extending downwardly away from the top support surface segment. Each side wall has a portion thereof with a radius of curvature substantially matching a corresponding conveyor roller. A portion of the first side wall extends toward and joins the second side wall, the second side wall further having a tail portion and a living hinge extending away from the tail portion.

Another embodiment of the invention is directed to a bridge for a conveyor system including a bridge frame including a top support surface segment having a top support surface. The bridge frame further includes first and second side walls extending downwardly away from the top support surface segment, each side wall having a portion thereof with a radius of curvature substantially matching a corresponding conveyor roller. An elastic bladder that forms at least a portion of a space providing an expandable brake chamber, such that a pressurized fluid introduced into the brake chamber causes the bladder to expand to provide a braking force to adjacent conveyor rollers. A portion of the first side wall extends toward and joins the second side wall, the second side wall further having a tail portion and a living hinge extending away from the tail portion.

BRIEF DESCRIPTION OF THE FIGURES

FIG. 3 shows an elevation view of an exemplary embodiment of a bridge for a conveyor system.

FIG. 3A-3C shows an elevation view of exemplary embodiments of a bridge for a conveyor system.

FIG. 9 shows an isometric view of an exemplary embodiment of a cap for a bridge for a conveyor system.

FIGS. 24 and 24A show perspective views of exemplary embodiments of extrusion apparatus for producing a multiwall tubular structure.

FIGS. 26A-26E show exemplary embodiments of extrusion outlines produced by the extrusion apparatus.

FIG. 27 shows a reverse, partial cutaway view of extrusion dies of FIG. 25.

DETAILED DESCRIPTION OF EXEMPLARY EMBODIMENTS

Exemplary embodiments are directed to a conveyor system and subassemblies and components of a conveyor system that overcome drawbacks associated with such conventional systems. While discussed in the context of a particular roller conveyor system, it will be appreciated that all of the aspects of that conveyor system are not required to be used in combination. Rather any one of the components or subassemblies can be separately employed in conjunction with otherwise conventional conveyor systems or otherwise combined in any manner desired.

Exemplary embodiments are directed to an extrusion mold, to a method and apparatus, and fluid dynamic principles to enable a self-guided helical rotation, which is created when the plastic state material (at an elevated temperature) is being extruded.

Extrusion is defined as the process of shaping material, such as aluminum, by forcing the material to flow through a shaped opening in a die. Extruded material emerges as an elongated piece of unitary construction with the same profile as the die opening. "Plastic state" as plastic state material, as used herein is intended to encompass the condition of a material that is suitable for extrusion through the dies of the present application. For purposes of the present application, the terms die and mandrel may be used interchangeably.

Figure 1:
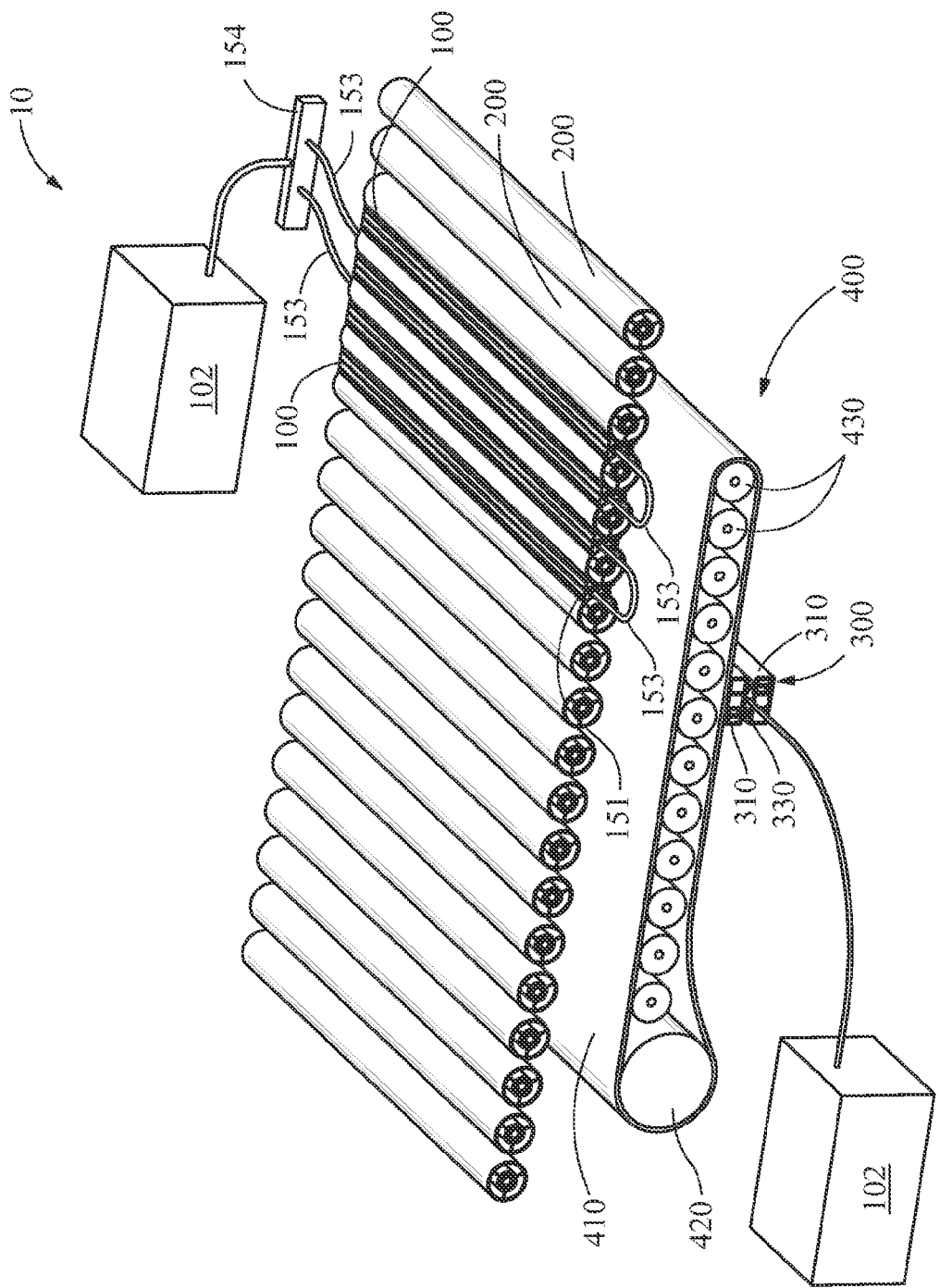
FIG. 1 shows a partial exploded view of an exemplary embodiment of a roller conveyor system.

Turning to FIG. 1, a roller conveyor system 10 constructed in accordance with exemplary embodiments is shown in schematic fashion. The roller conveyor system 10 includes a plurality of conveyor rollers 200 that are positioned within a frame (omitted from FIG. 1 for clarity and seen in FIG. 4) such that each roller can freely rotate about its axis in the absence of an applied braking force. It will be appreciated that while illustrated with respect to a belt-driven roller conveyor system 10, the invention is not so limited and that one or more aspects of the invention can be used in conjunction with any suitable roller conveyor system such as gravity and chain driven systems, for example.

In belt-driven systems, such as the system 10 shown in FIG. 1, the conveyor rollers 200 are driven by a drive system 400 underlying the conveyor rollers 200. The drive system 400 includes a drive belt 410 and one or more drive rollers 420 and operates in a conventional manner. That is, power directed to the drive roller 420, typically through a motorized gear box (not shown) connected to the drive roller 420, causes the drive roller 420 to rotate. That, in turn, sets the drive belt 410 in motion. The drive system 400 can further include a plurality of drive system rollers 430 that support the drive belt 410, but which are not separately connected to the gear box.

One or more lifter assemblies 300 are positioned under the drive system 400 that raise the drive system 400 from a first, stand-by or retracted position to a second, engaged or extended position using compressed air or other suitable compressed or pressurized gas from a pressurized gas source, such as a compressor 102 to inflate a bladder 330 attached to or otherwise arranged internal of the lifter assembly 300, as discussed in greater detail herein. When the drive belt 410 is directed into abutting contact with the rollers 200, the rollers 200 spin, causing a bale or other article situated on the rollers to move forward in a manner consistent with conventional roller conveyor system operation. In another embodiment, a hydraulic system uses a fluid (i.e., a gas and/or a liquid) as a working fluid. For purposes herein, the term gas, which includes air, and fluid (gas and/or liquid) can be used interchangeably.

Although a single lifter assembly 300 is shown in the roller conveyor system 10 of FIG. 1, it will be appreciated that numerous lifters can be employed which can depend upon a variety of factors, including the weight of the drive system 400 being lifted, as well as other considerations such as staging and use specifications for a particular system 10. It will further be appreciated that while the roller conveyor system 10 shown in FIG. 1 is a single segment, multiple segments employing multiple drive systems 400 and other components in series can be employed, depending on the total desired length of a particular roller conveyor system 10. Additional views of conveyor systems in accordance with the exemplary embodiments described herein are shown at FIGS. 19 through 22, in which the conveyor rollers are shown situated in a frame, under which a drive system having a drive belt, drive wheel and drive rollers is positioned, with a lifter assembly in an extended configuration forcing the drive system into contact with the conveyor rollers.

In some embodiments, one or more bridges 100 are employed that extend the length of the rollers 200 and which provide a safe walkway for travel across the conveyor system 10 without otherwise impeding conveyor system operation (shown in FIG. 1 as well as in FIGS. 19-22).

Figure 4:
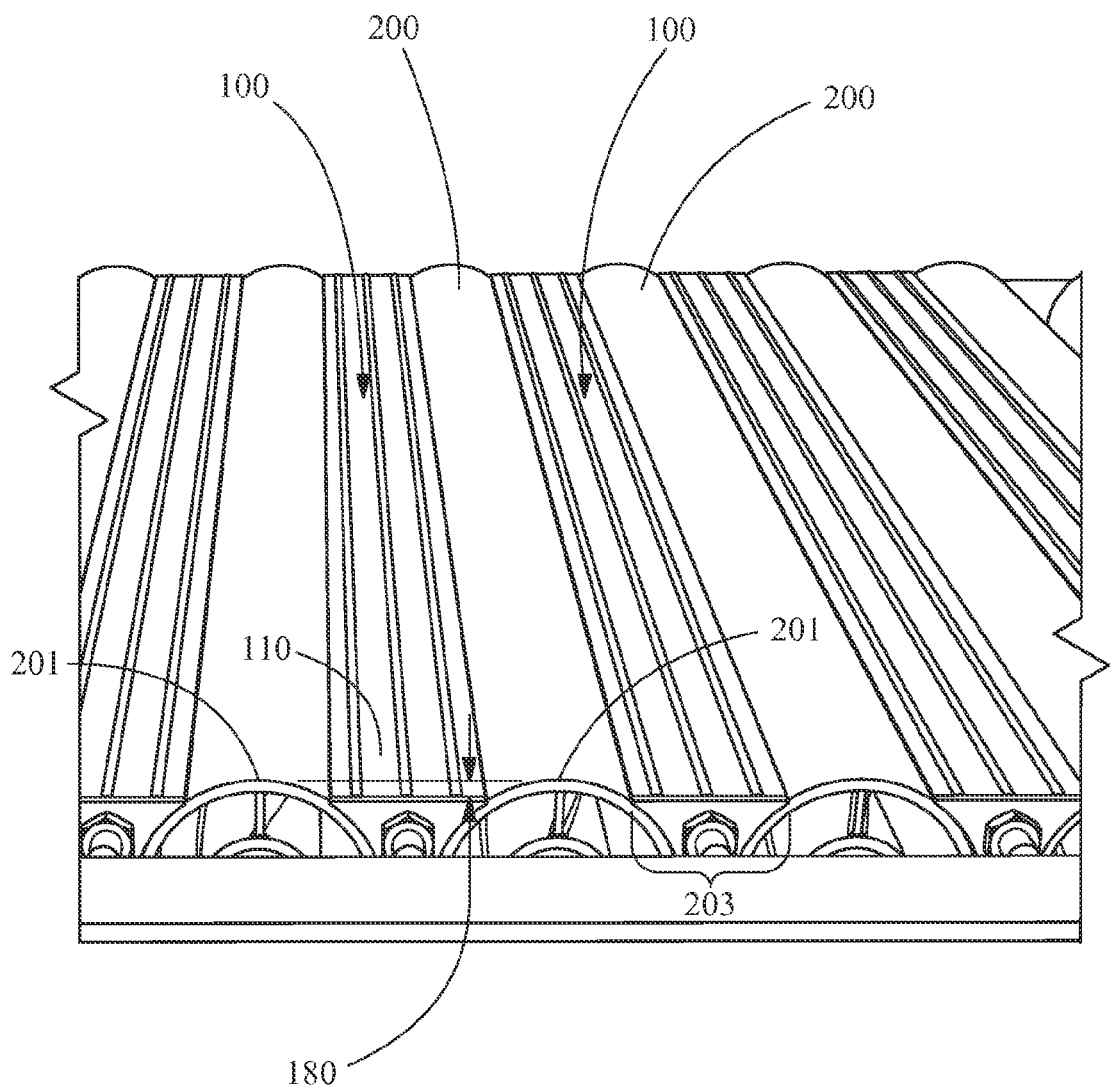
FIG. 4 shows a perspective view of an upper portion of conveyor rollers with an exemplary embodiment of bridges installed between adjacent conveyor rollers.
Figure 5:
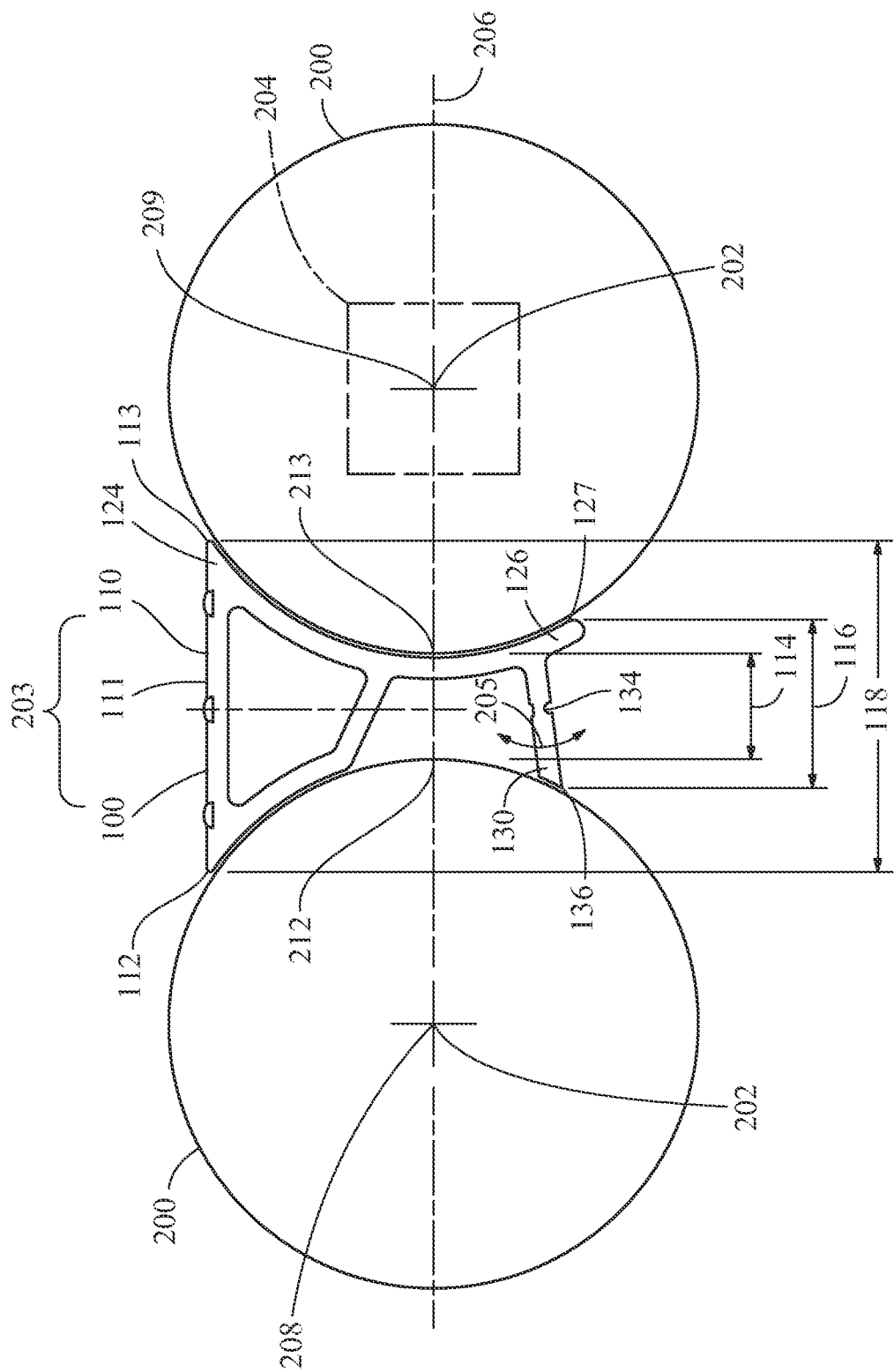
FIG. 5 shows an enlarged elevation view of an exemplary embodiment of a bridge installed between adjacent conveyor rollers.
Figure 6:
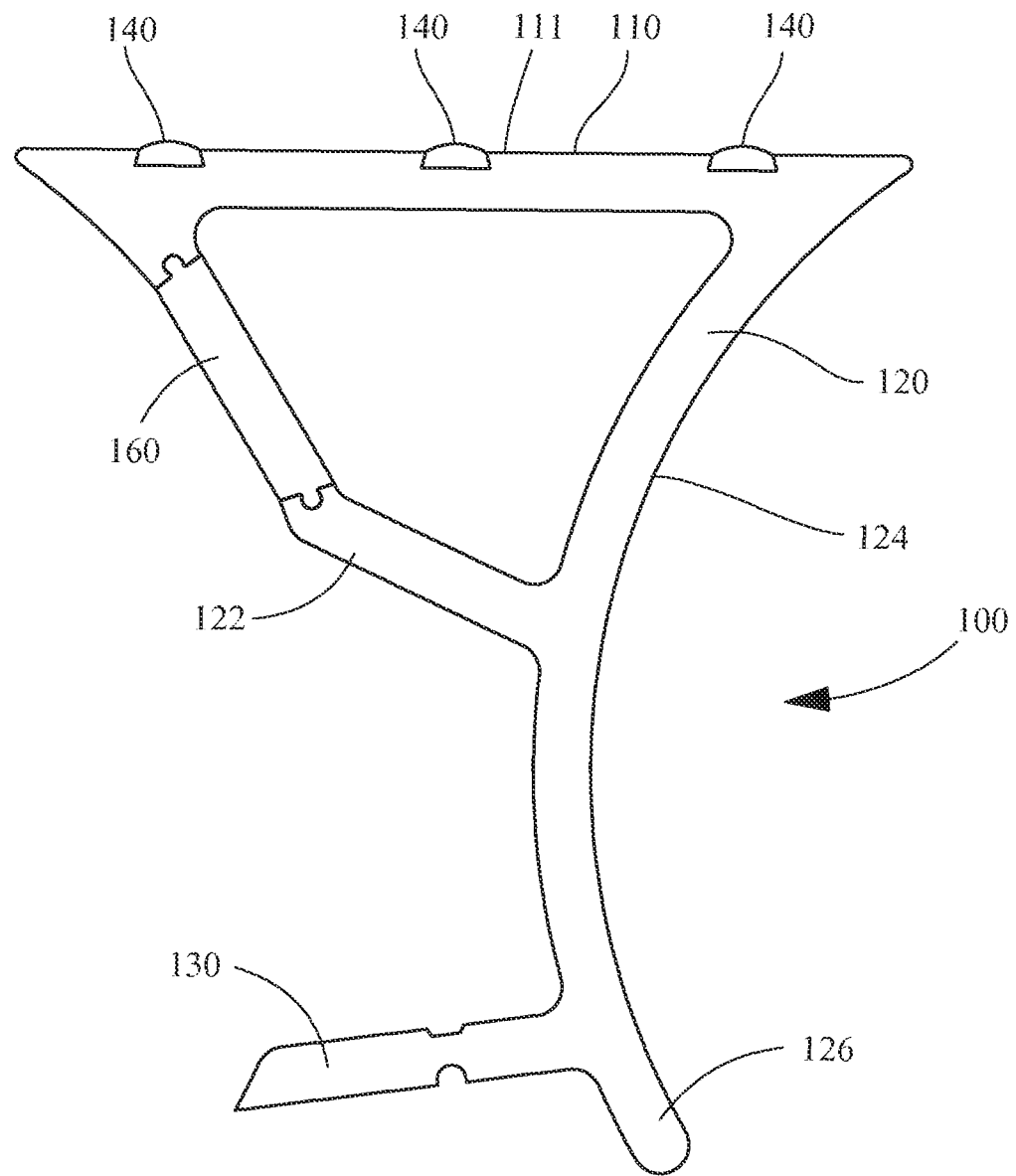
FIG. 6 shows an elevation view of an exemplary embodiment of a bridge for a conveyor system.

Turning to FIGS. 2-9, various exemplary embodiments of the bridge 100 are shown. As best illustrated in conjunction with FIGS. 2 and 3, the bridge system or bridge 100 includes a bridge frame 120 that includes a top support surface segment 111, the bridge frame 120 further having an upwardly facing surface or top support surface 110 and respective first and second side walls 122, 124. In one embodiment, such as shown in FIG. 3, first and second side walls 122, 124 are each joined to top support surface segment 111. In another embodiment, such as shown in FIG. 6, only one side wall, such as second side wall 124 is joined to top support surface segment 111. The side walls are constructed with a radius of curvature over at least a portion of their length that substantially matches that of the conveyor rollers 200 with which they will be employed. As illustrated, the first side wall 122 then angles away from its adjacent roller toward, and ultimately joining, the second side wall 124. In one embodiment, an air space or hollow chamber 128 within the bridge 100 is thus formed that can extend the entire length of the bridge 100. The second side wall 124 extends beyond the junction point with the first side wall 122, having a tail portion 126 that continues to follow the curvature or substantially match the curvature of its adjacent roller 200 (best seen in FIG. 5). The length of the tail portion 126 of the second side wall 124 is such that when the bridge is inserted between two adjacent conveyor rollers 200, the tail portion 126 is at least partially beneath its adjacent roller 200. This aids in preventing the bridge 100 from popping back out during roller conveyor system operation.

The bridge frame 120 further includes a living hinge 130 extending away from the tail portion 126 of the second side wall 124 toward the opposing roller 200. The living hinge 130 is located along the tail portion 126 so that a distal end 136 of the living hinge 130 is positioned under the opposing roller 200 to further resist removal of the bridge 100. The living hinge 130 includes a notch 134 that aids in allowing the bridge system or bridge 100 to be readily inserted in the gap between two conveyor rollers 200 by application of a downward force as at least the living hinge 130 flexes at the notch 134 during insertion. That is, in one embodiment, in addition to living hinge 130 flexing at the notch 134 to facilitate insertion, a portion of tail portion 126 can also flex during insertion. The living hinge 130 resists removal in the opposite direction, because the notch 134 does not provide a predisposition for the living hinge 130 to flex in the opposite direction. The living hinge 130 can also include a protrusion 132 formed at the distal end 136 to further resist removal of the bridge 100 during roller 200 operation.

Stated another way, as shown in FIGS. 3 and 5, the bridge frame 120 includes the top support surface segment 111 having opposed ends 112, 113, the living hinge 130 having the distal end 136, and the tail portion 126 having a distal end 127. As further shown in FIG. 5, adjacent parallel conveyor rollers 200 each have a centered longitudinal axis 202 about which the rollers 200 rotate during operation of the conveyor system. In FIG. 5, longitudinal axes 202 extend in and out of the paper, appearing as points (axis 202 for single roller 200 is better shown in FIG. 10). A reference plane 204 is provided that is transverse to the longitudinal axes 202. A line 206 coincident with plane 204 passes through longitudinal axes 202 and intersects longitudinal axes 202 at intersection points 208, 209, and further intersects facing outer surface portions of the conveyor rollers at points 212, 213. Plane 204 similarly is intersected with bridge 100, yielding intersection points corresponding to opposed ends 112, 113 of top support surface segment 111, distal end 136 of living hinge 130, and distal end 127 of tail portion 126. As further shown in FIG. 5, intersection points 212, 213 of facing surfaces of adjacent parallel conveyor rollers 200 are separated by a spacing or distance 114. A spacing or distance 116 separates the distal end 136 of living hinge 130 and the distal end 127 of tail portion 126. Similarly, a spacing or distance 118 separates the opposed ends 112, 113 of top support surface segment 111. As shown in FIG. 5, since distance 116 is greater than distance 114, a downward force is needed to be applied to bridge 100 relative to the adjacent parallel rollers 200, in order to insert bridge 100 between the adjacent parallel conveyor rollers 200. In response to a downward force applied to bridge 100 relative to the adjacent parallel conveyors 200, distal end 136 of living hinge 130 is urged into elastic rotational movement 205 about the notch 134 (and also in one embodiment, a small amount of elastic deflection of distal end 127 of tail portion 126) until distance 116 is reduced until temporarily equal to distance 114, permitting distal end 136 of living hinge 130 and distal end 127 of tail portion 126 of bridge 100 to be downwardly directed between the adjacent parallel conveyor rollers 200. Once installed, the spacing between distal end 136 of living hinge 130 and distal end 127 of tail portion 126 returns to distance 116, which is greater than distance 114 between the adjacent parallel conveyor rollers 200, and since the spacing between opposed ends 112, 113 of bridge 100 is also greater than distance 114, bridge 100 is maintained in its installed position between the adjacent parallel conveyor rollers 200.

In an exemplary embodiment, the bridge 100 is sized so that the first and second side walls 122, 124 substantially match the curvature of the rollers 200 along the entire length but also sized and positioned so that the first and second side walls 122, 124 ordinarily do not contact the rollers, or are substantially maintained in a non-contacting position relative to corresponding conveyor rollers 200. The term substantially match is intended to mean that the radii of the first and second sidewalls are substantially equal to or slightly greater than the radii of the rollers along the entire longitudinal length of the rollers. In one embodiment, as generally collectively shown in FIGS. 3 and 5, small portions of the upper regions of surfaces 122, 124 near ends 112, 113 of top support surface segment 111 of top support surface 110 rest in minimal areal contact with corresponding surfaces of rollers 200 by force of gravity acting on bridge 100. However, due at least to the lightweight construction of bridge 100, resistance to rotational movement of rollers 200 as a result of contact with the upper regions of surfaces 122, 124, is minimized. In another embodiment, a portion of the upper regions of surfaces 122, 124 may be constructed of or have a layer of a material having a low coefficient of friction applied thereto. This construction, or a similar construction reduces friction that must be overcome when the drive system 400 is in contact with the rollers 200 and which could cause premature wearing of the rollers and/or the bridge, as well as reduce roller speeds or increase power requirements.

FIG. 4 illustrates an embodiment in which a plurality of bridges 100 have been installed side by side in a conveyor system. As further shown in FIGS. 4 and 5, each bridge 100 is situated between two adjacent rollers 200, with multiple bridges 100 placed in corresponding adjacent roller gaps 203 in FIG. 4. As seen in these two FIGS., the top support surface 110 of the bridge 100 lies below and is separated from the upper tangential points 201 of the conveyor rollers 200 by a distance 180. Upper tangential points 201 contact articles (not shown) that are moved by the conveyor rollers. Stated another way, maintaining the distance 180 between tangential points 201 and the top support surface 110 of the bridge 100 prevents the bridge 100 from interfering with articles, such as bales or other objects being conveyed along the rollers 200. As a result, the bridge 100 can be permanently installed in the roller conveyor system 10 rather than being inserted and removed only when crossing. As FIG. 4 also reflects, it may be desirable to employ two or more bridges 100 adjacent one another which provides a wider area that can enable an individual to cross the bridge 100 more easily.

Figure 2:
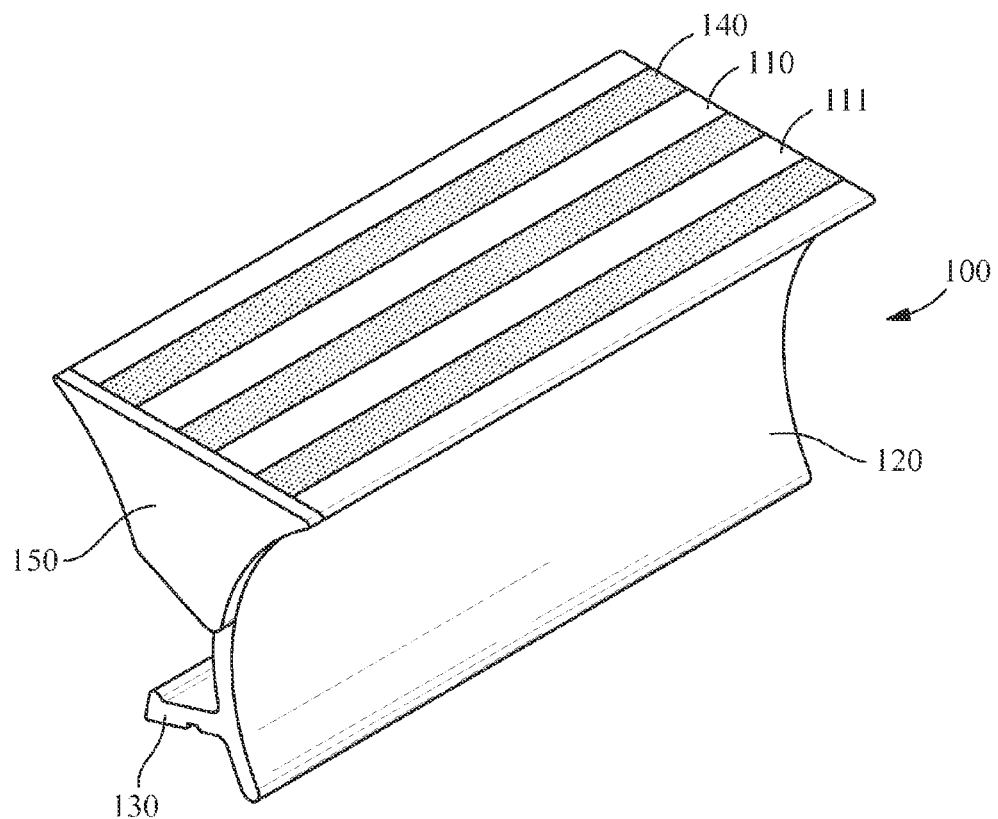
FIG. 2 shows an isometric view of an exemplary embodiment of a bridge for a conveyor system.
Figures 8A, 8B:
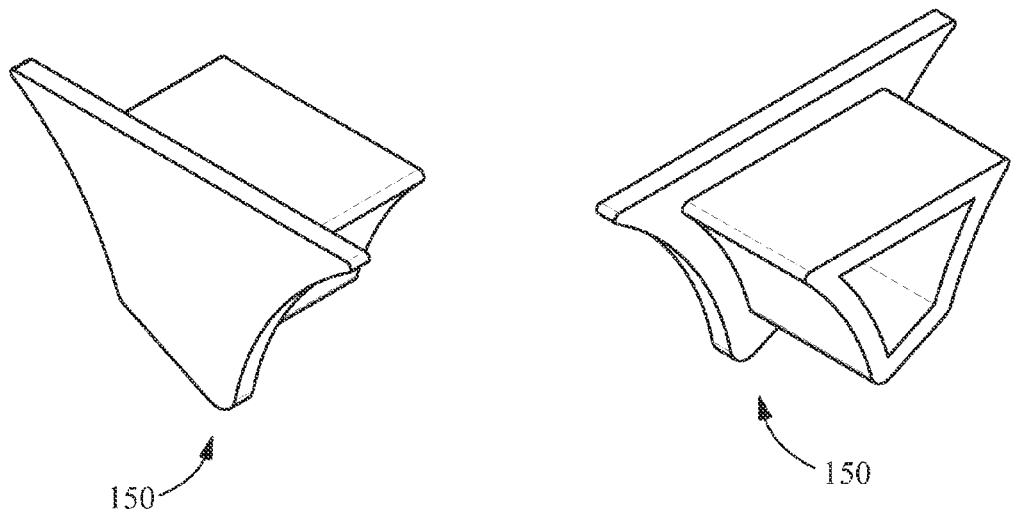
FIG. 8A shows an isometric view of an exemplary embodiment of a cap for a bridge for a conveyor system.
FIG. 8B shows an opposed isometric view of the cap of FIG. 8A.

The bridge 100 can be constructed from any suitable material, but is typically polymeric, such as polypropylene, PVC, ABS or any other type of polymer that can be employed in an extrusion process by which the bridge 100 can be advantageously and economically manufactured. Other methods of manufacture include injection molding, stereo-lithography, and 3-D printing, by way of example only. To reduce weight and material cost, the bridge 100 can be formed so that it is hollow in the region between the junction of the first and second side walls 122, 124 as described above with respect to the hollow chamber 128. In that case, the bridge 100 can optionally include a cap 150 at either or both ends, as best seen in FIG. 2. As shown in the more detailed view of the cap 150 in FIGS. 8A and 8B, which can be manufactured by injection molding, for example, the cap 150 can be formed to attach to the bridge frame 120 via, for example, an interference fit, adhesive or other suitable method, the cap 150 being inserted at each end into the hollow chamber 128 at the end of the bridge frame 120, forming a sealed joint or fluid tight connection between caps 150 and corresponding opposed ends of bridge frame 120.

The top support surface 110 of top support surface segment 111 of bridge frame 120 (FIG. 3), designed for aiding an individual in crossing from one side of the conveyor system to the other, is typically substantially planar. However, it will be appreciated that at least a portion of the top support surface 110 can incorporate some level of texture or other nonslip feature to reduce the likelihood of slippage while walking thereon. In one embodiment, the nonslip feature can be a treatment of at least a portion of the top support surface 110 of the top support surface segment 111, such as chemical, application of abrasive material, incorporating surface features in a mold or die, heat treatment or other suitable technique that results in surface features incorporated thereon. In one embodiment, the surface features can be a layer of nonslip material applied to at least a portion of the top support surface 110 of top support surface segment 111. In one embodiment, at least a portion of the top support surface 110 of top support surface segment 111 includes one or more strips 140 of a nonslip or high-tack material incorporated therein. One exemplary suitable material includes a copolymer of ethylene propylene diene monomer (M-class) rubber, or EPDM rubber and polypropylene, commercially available under the trademark SANTOPRENE®, although any material that can provide additional traction can be employed. In some embodiments, the high-tack or nonslip strips 140 can be incorporated by being co-extruded with the bridge frame 120 during manufacture of the bridge 100 and/or through vulcanization.

Figure 3A:
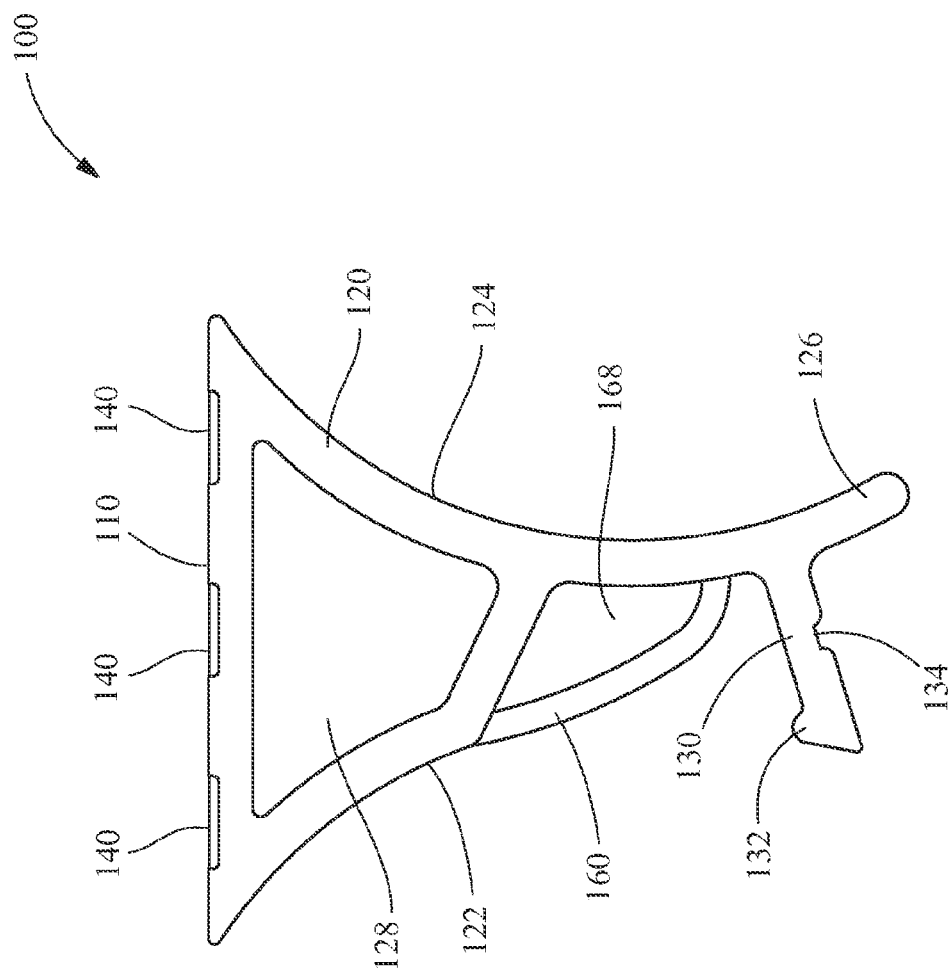
Figure 3B:
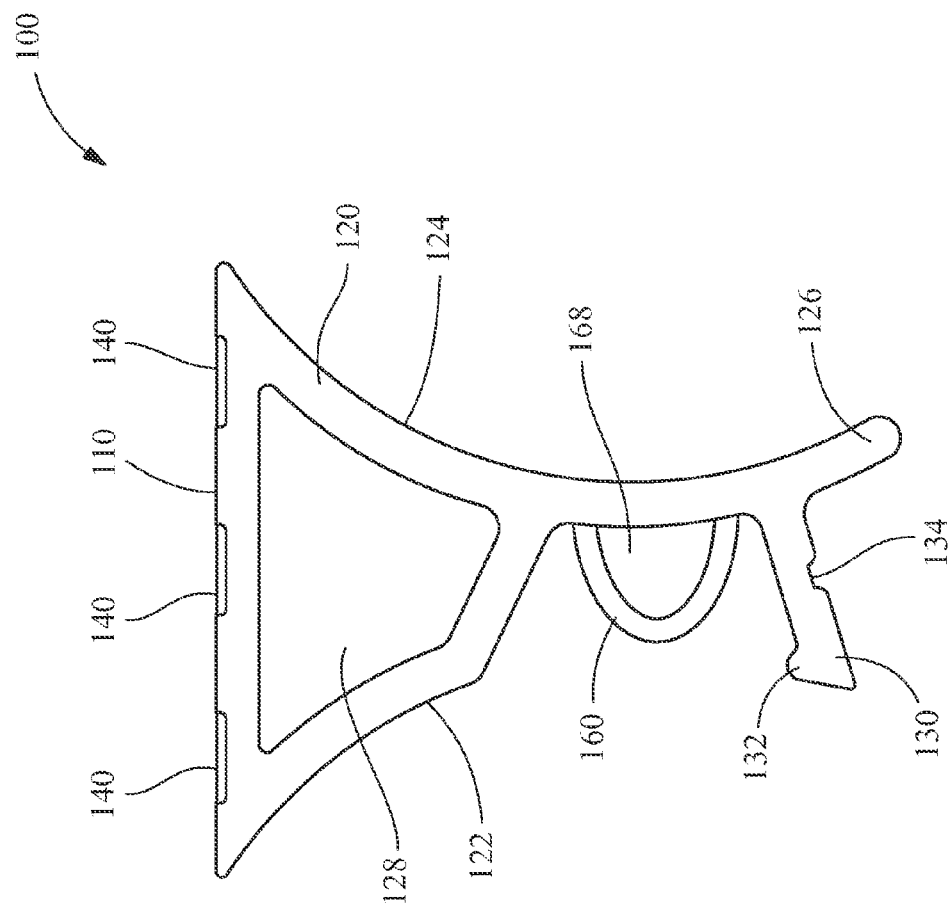

In some embodiments, the bridge 100 further provides a brake function or braking system or brake system 162. In one bridge 100 providing a brake function, an expandable elastic bladder 160 is optionally attached to the outer surface of the bridge frame, such as from one point or portion of the first side wall 122 to another point or portion of the first side wall 122 (FIG. 6) and/or the living hinge 130 (FIG. 3 shows elastic bladder 160 attached to first side wall 122 and living hinge 130), forming an air space, air chamber, brake chamber or chamber 168 intermediate the elastic bladder 160 and the bridge frame 120. In other embodiments, expandable elastic bladder 160 can be attached to other portions of the outer surface of the bridge frame, such as from one point or portion of the first side wall 122 to a point or portion of the second side wall 124 (FIG. 3A), or from different points or portions of the second side wall 124 (FIG. 3B), or from a point or portion of the second side wall 124 to a point or portion of the living hinge 130 (FIG. 3C), or any combination thereof, forming an air space, air chamber, brake chamber or chamber 168.

In another embodiment, as seen in FIG. 6, a portion of the first side wall 122 is partially replaced by the expandable elastic bladder 160 along at least a portion of the length of the bridge frame 120.

In either case, the elastic bladder 160 can be constructed of any rubber or other elastic material including, for example, nitrile rubber, such as that available under the trademark ALCRIN®. Like the high tack strips 140, the elastic bladder 160 can be manufactured as part of a co-extrusion process with the rest of the bridge frame 120, by vulcanization, or any other suitable method, including separate manufacture and attachment of the elastic bladder 160 using an adhesive, all by way of example. Furthermore, it will be appreciated that while the elastic bladder 160 is illustrated in FIG. 6 as partially replacing the first side wall 122, alternatively or in combination with that construction, the elastic bladder 160 could partially replace a portion of the second side wall 124 adjacent the opposite roller.

In operation, the brake system 162 is engaged when a pressurized gas 164 is introduced into a brake chamber or chamber 168, which can be an air space as shown in FIG. 3, hollow chamber 128 formed in the interior of the bridge frame 120 shown in FIG. 6, or any other air space enclosed by the elastic bladder 160, as it will be appreciated that still other ways of incorporating an elastic bladder 160 into the structure of the bridge 100 to perform a braking function as subsequently described are also contemplated. For example, in yet another embodiment, the elastic bladder 160 attached to the bridge frame 120 can be an air bag in which the elastic bladder 160 itself fully defines an internal volume that forms the brake chamber into which air can be introduced directly.

The term bladder as used herein is intended to include not only an elastic material that can be utilized in combination with portions of the bridge frame to define an internal volume that is expandable, such as by pressurized gas, and, by virtue of a sufficient amount of such expansion, generates a braking force. The term bladder is intended to also include an elastic material that by itself forms an expandable internal volume, by virtue of a sufficient amount of such expansion, generates a braking force.

The brake chamber is sealed at both ends so that when air is introduced, the increasing air pressure causes the elastic bladder 160 to expand, essentially expanding the effective width of the bridge 100 within the gap between the conveyor rollers 200 and thereby forcing the first and second bridge side walls 122, 124 against their respective adjacent rollers 200 to jam or prevent rotational movement of the rollers 200 relative to the bridge 100. In one embodiment, the elastic bladder 160 extends along all or nearly all of the entire length of the bridge 100, which increases the surface area of contact achieved by the bridge 100 with the rollers 200.

In one embodiment, introducing compressed air to achieve a pressure of about 90 psi in the hollow chamber 128 is sufficient to cause the elastic bladder 160 to expand about 40 to 60 mils (0.040 to 0.060 inch), which provides sufficient contact for the braking force; in the unexpanded state (or embodiments in which an elastic bladder is not employed) a gap of about 20 mils (0.020 inch), between the rollers 200 and the first and second side walls 122, 124 is sufficient to allow the rollers to spin freely. It will be appreciated, however, that these values are exemplary only and that any other pressures, spacings, and expanded/unexpanded distances can be used to achieve satisfactory results, which can vary based on numerous different factors, including materials of construction, length, size, etc., as well as other aspects of particular roller conveyor system with which the bridge 100 will be employed.

When the elastic bladder 160 is expanded, the contact force or braking force exerted by the bridge 100 along the length of the roller 200 is sufficient to prevent the roller from spinning freely. Accordingly, even if an individual crossing the bridge 100 steps on the rollers 200, the brake prevents the rollers 200 from spinning in place, which can further increase safety for users as they cross the bridge 100. The brake system can also be employed to prevent articles from inadvertently falling forward along the roller conveyor system 10 by locking out the rollers 200 and preventing "runaway" incidents.

Exemplary embodiments employing such a braking system significantly increase roller contact surface area and thus the braking power found in conventional braking systems which operate in a different manner and further fail to provide the dual benefit of ensuring a safe walking surface. In some embodiments, the braking systems can achieve as much as 4000 square inches or more of contact between the rollers 200 and the bridge frame 120, although even lesser surface areas can be used to provide adequate braking power as it will be appreciated that the particular area required to achieve satisfactory results in any particular conveyor system will vary depending upon a variety of factors, including the size of the system and the length of the bridge and/or rollers employed.

In bridge embodiments employing a brake system, the ends of the hollow chamber 128 can be sealed using the end caps 150 previously shown and described in FIG. 8. Compressed air or other pressurized gas can be introduced into the hollow chamber 128 through a modified end cap 151, such as one manufactured with an aperture 152 formed therein (shown in FIG. 9) to which a boss with a self-tapping nipple or other suitable gas inlet can be securely attached to introduce the gas, providing fluid communication between at least one end cap 151 and the hollow chamber 128. Even in embodiments employing a brake chamber different from the hollow chamber 128 (such as those employing the design shown in FIG. 3 and air chamber 168), the hollow chamber 128 can still be in fluid communication with air chamber 168 to conveniently permit the flow of gas thereto, the total volume of the brake chamber thus being the total volume of the hollow chamber 128 and air chamber 168. It will be appreciated that while convenient, the manner in which gas is introduced into the brake chamber is not limited to the ends of the bridge 100 and that any suitable entry point for introducing a pressurized gas, such as air or other suitable gas to the brake chamber can be employed.

In embodiments in which multiple bridges 100 having an elastic bladder 160 are employed adjacent one another, the compressed gas can advantageously be introduced into all of the bridges 100 in series via a conduit 153 (FIG. 1) that couples at least one other bridge 100, and preferably the two or more bridges 100 together to provide fluid communication in series between the brake chambers. In such cases, the modified caps 151 of FIG. 9 can be used to close the hollow chamber 128 with only the final opening in the series being the closed cap 150 of FIGS. 8A and 8B. In other embodiments, a manifold 154 (FIG. 1) can be used to introduce compressed air via conduits 153 into or otherwise interconnect the brake chambers in parallel.

Whether compressed air is introduced into the air chamber of each bridge 100 individually or into multiple bridges, whether in parallel or in series, the air (or any other suitable compressed gas) can be introduced to the bridge 100 from its source, typically a compressor 102 (FIG. 1), using manual or automated valves to open or close the flow of compressed air into one or more of the bridges 100.

Figure 7:
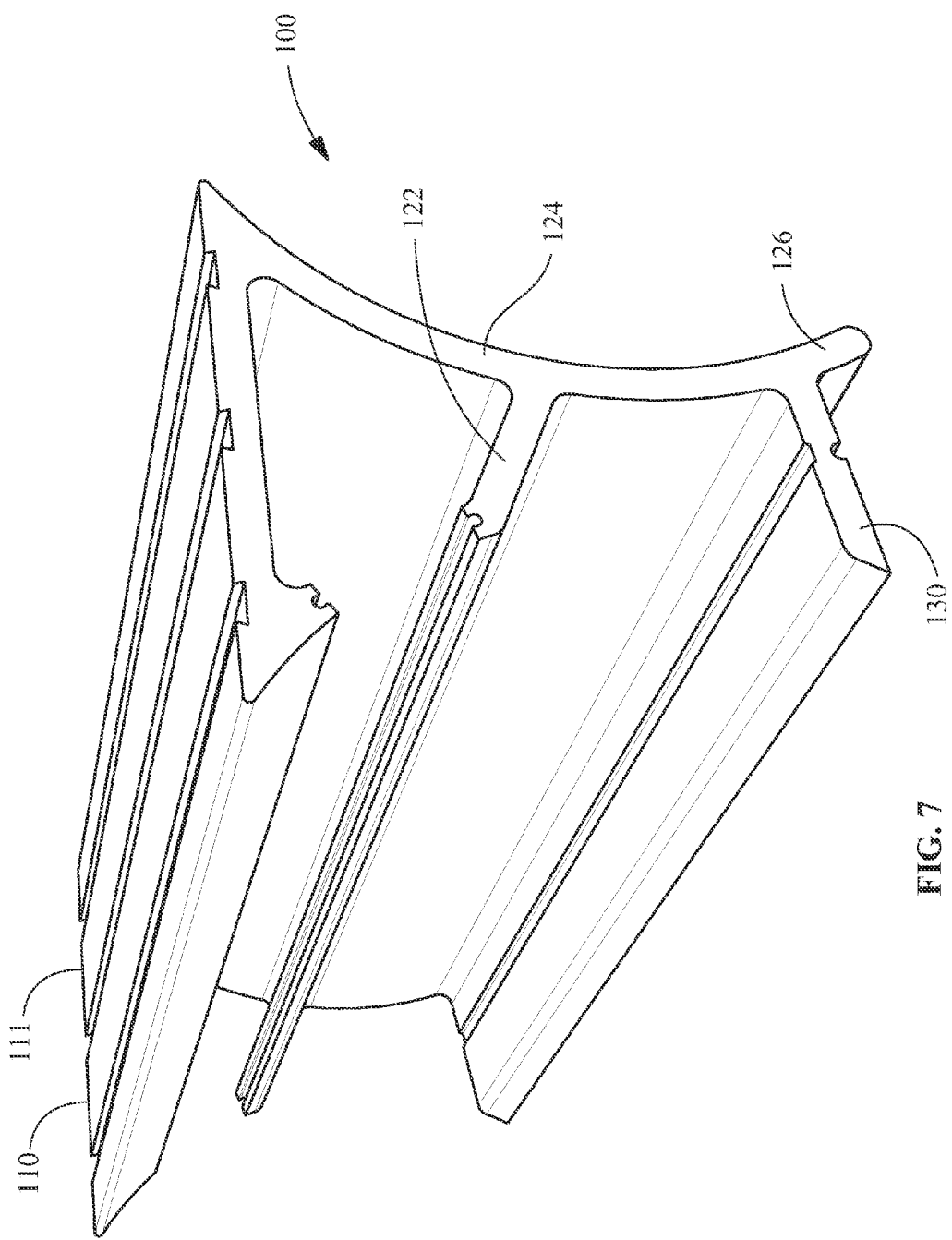
FIG. 7 shows an isometric view of the bridge of FIG. 6.

As discussed briefly, the elastic bladder 160 can optionally be formed in the bridge 100 as part of the extrusion process during manufacture or by subsequent, separate attachment. FIG. 7 illustrates a view of one embodiment of a bridge frame 120 prior to incorporation of extruded high-tack or nonslip strips 140 or elastic bladder 160.

In some embodiments, a controller (not shown) can be employed for automatic brake application in which the controller is in electronic communication with a sensor and one or more valves that control the flow of compressed air into the bridge 100. For example, a sensor such as an electronic eye can be used to determine when something (such as a worker or a machine) is in close proximity to the side of the system of bridges 100 or that a runaway bale is approaching. Upon the controller's receipt of that signal, the controller can automatically adjust the valves controlling the flow of compressed air to cause the elastic bladder 160 to expand, and thus the brake to be applied, for a pre-determined period of time. Alternatively, the brake could be manually operated.

In either of the manual or automatic embodiments, the brake could be set up for either a continuous off or a continuous on mode as a default. In a continuous off mode, air is not directed into the brake chamber of the bridge 100 and the elastic bladder 160 is not expanded absent an affirmative act to do so. As a result, the conveyor rollers 200 can spin freely. In one such embodiment, a sensor, such as a light curtain for example, can be used to automatically determine when the brake should be applied (i.e., when the light curtain is broken). Conversely, in a continuous on mode as a default setting, air is continuously introduced into the brake chamber of the bridge 100 and the elastic bladder 160 is expanded such that the brake is constantly engaged absent a sensed signal that a product in need of conveying is approaching, for example through the use of an electronic eye. At that point, the controller could automatically cut the flow of gas to the brake chamber, causing the elastic bladder 160 to deflate and permitting the conveyor rollers 200 to spin freely.

To further enhance the usefulness of the bridge 100 in manufacturing environments, it may be desirable to employ high visibility colors and/or other highly visually prominent indicia so that the bridge 100, and thus a safe crossing location, can more easily be identified, a feature that can also be employed with other aspects described herein. Furthermore, the bridge 100 (as well as the conveyor rollers 200, lifter assembly 300 and other components of the roller conveyor system 10), can be constructed of materials that are self-extinguishing or contain additives that render them as such.

Turning to FIGS. 10-13, according to another exemplary embodiment, a new roller for use with a roller conveyor system is also provided. While described herein primarily with respect to the conveyor rollers 200, it will be appreciated that features of exemplary embodiments could also be readily employed for use with the drive system rollers 430 (FIG. 1) of the drive system 400. The rollers, in accordance with exemplary embodiments, maximize open volume within the roller interior while still having sufficient strength to support the same kinds of loads experienced by conventional roller conveyer systems.

Figure 10:
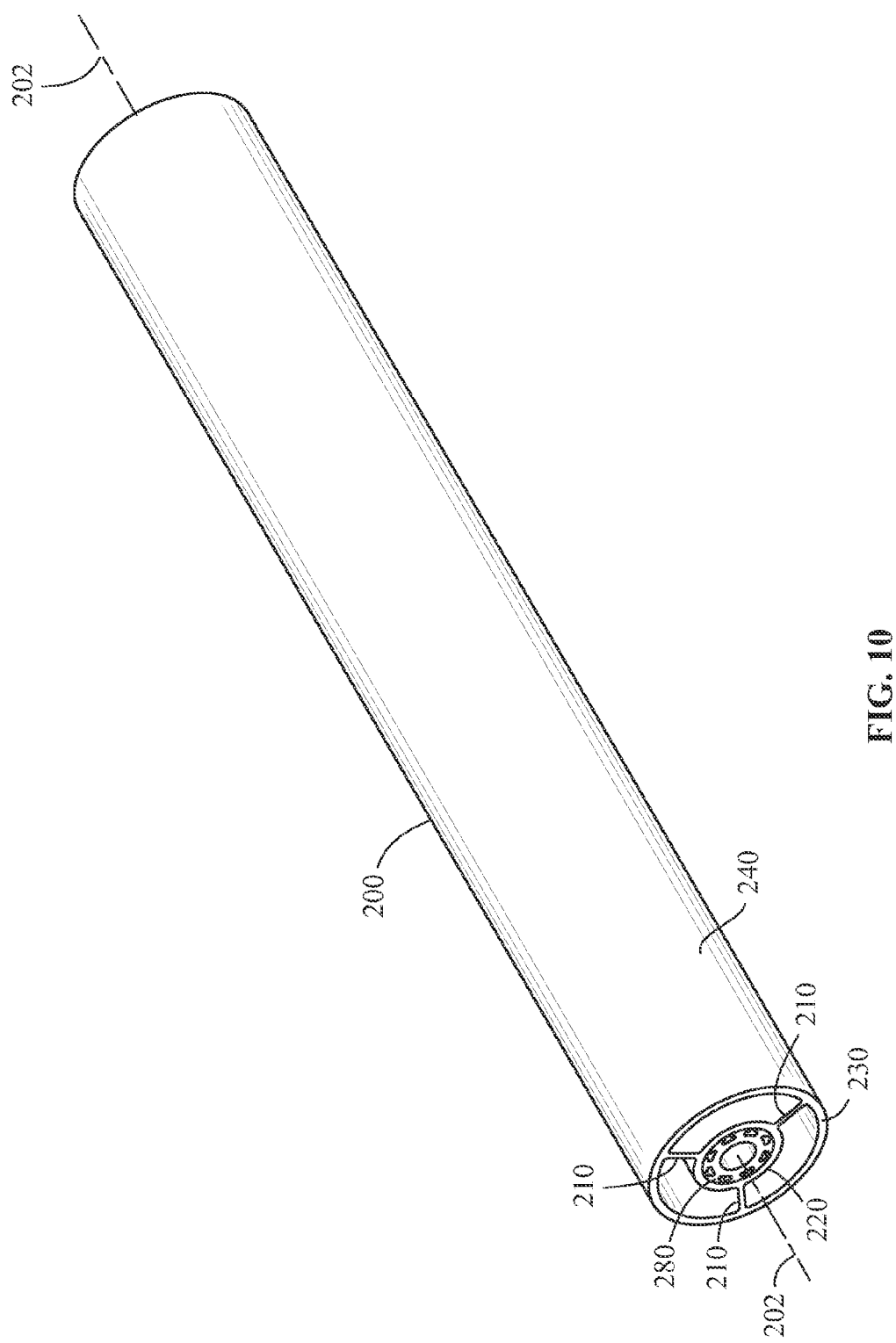
FIG. 10 shows a perspective view of an exemplary embodiment of a conveyor roller.

Referring to FIG. 10, the conveyor roller 200 comprises a plurality of internal forms or arms 210 extending radially outward from a central core 220 toward an outer wall 230 of the roller 200. In other words, the internal forms or arms 210 are in supporting relationship with the outer wall 230. The conveyor roller 200 employs at least one, typically at least two, and in some embodiments, three or more radially outwardly extending internal forms or arms 210. The arms 210 extend axially along the length of the central core 220. The arms 210 can be axially linear or can wrap helically about the central core 220 in the axial direction.

Figure 11:
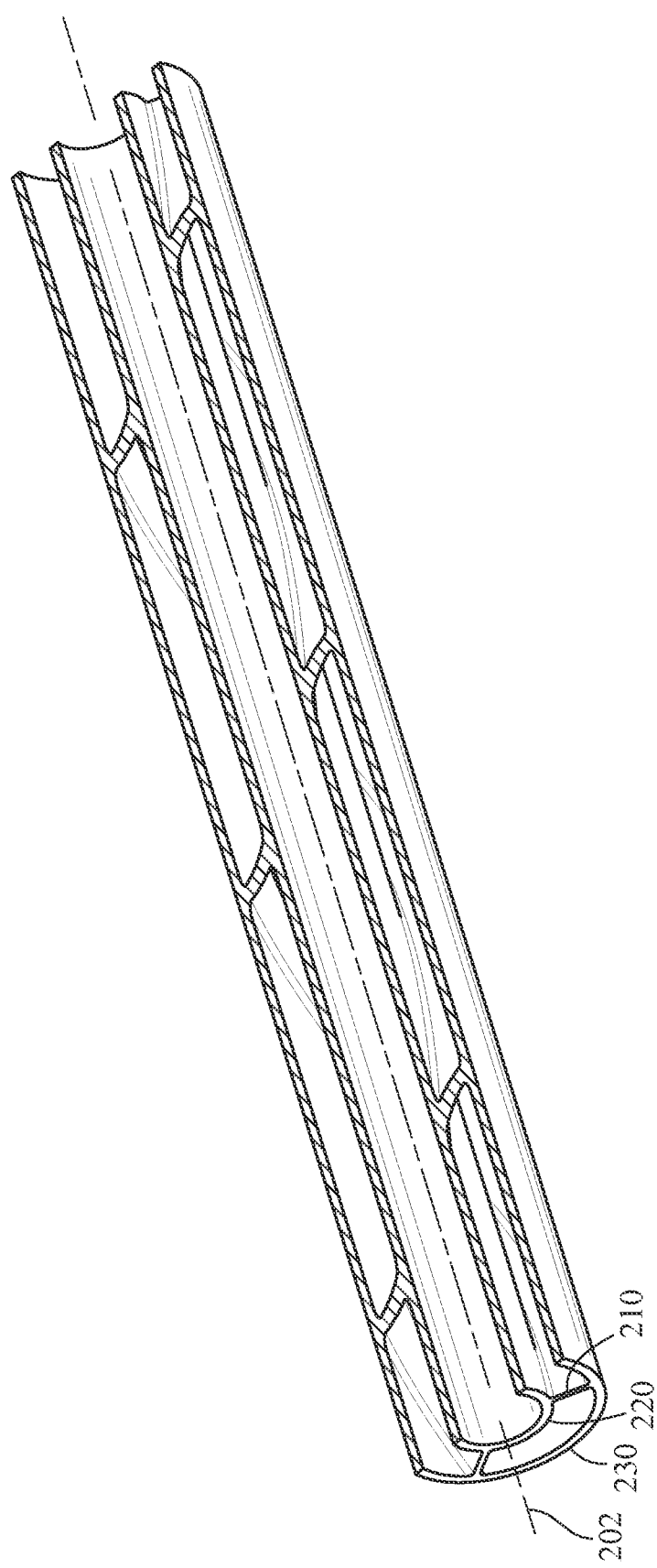
FIGS. 11-13 show different cross-sectional views of the conveyor roller of FIG. 10.
Figure 12:
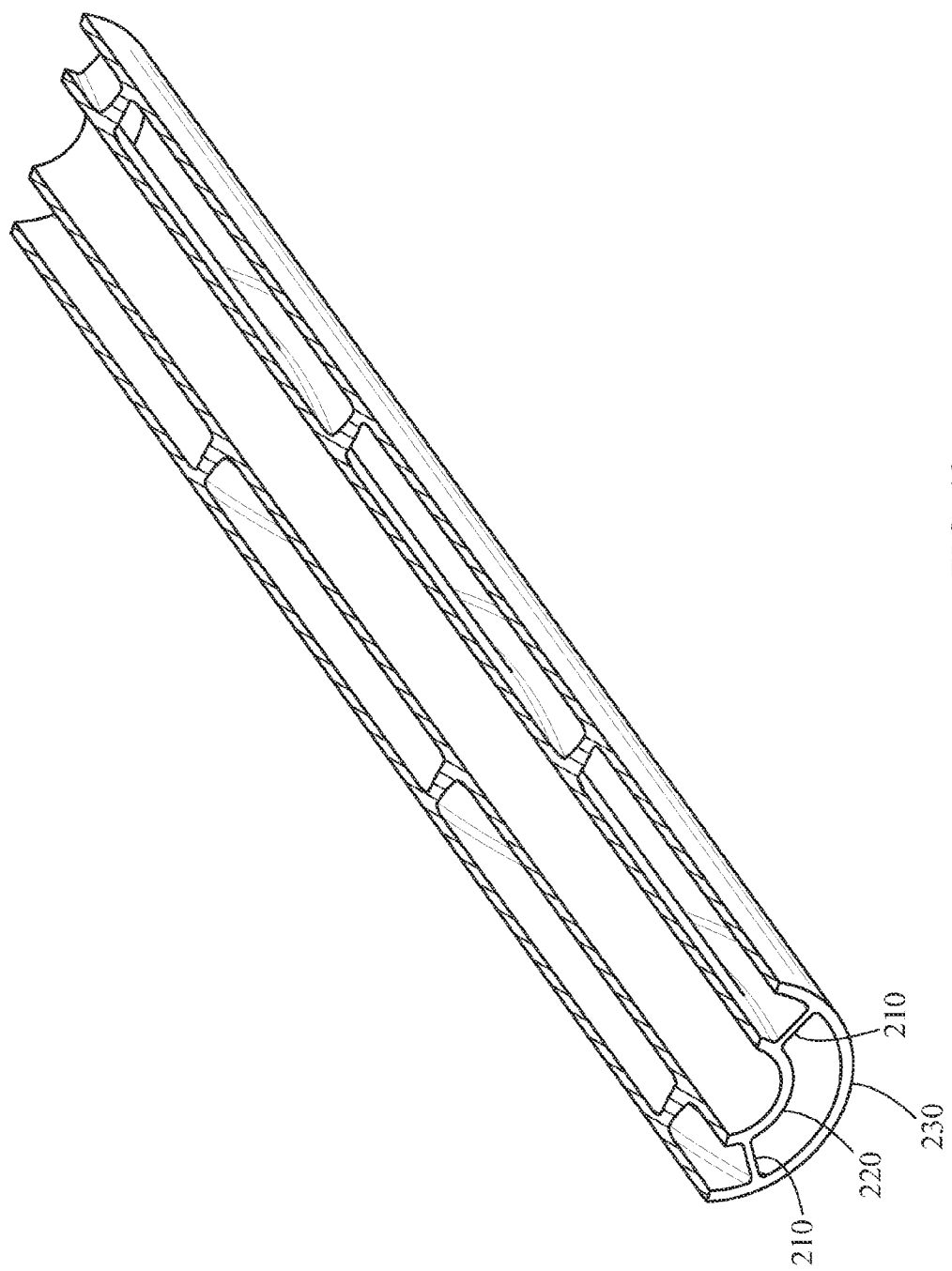
Figure 13:
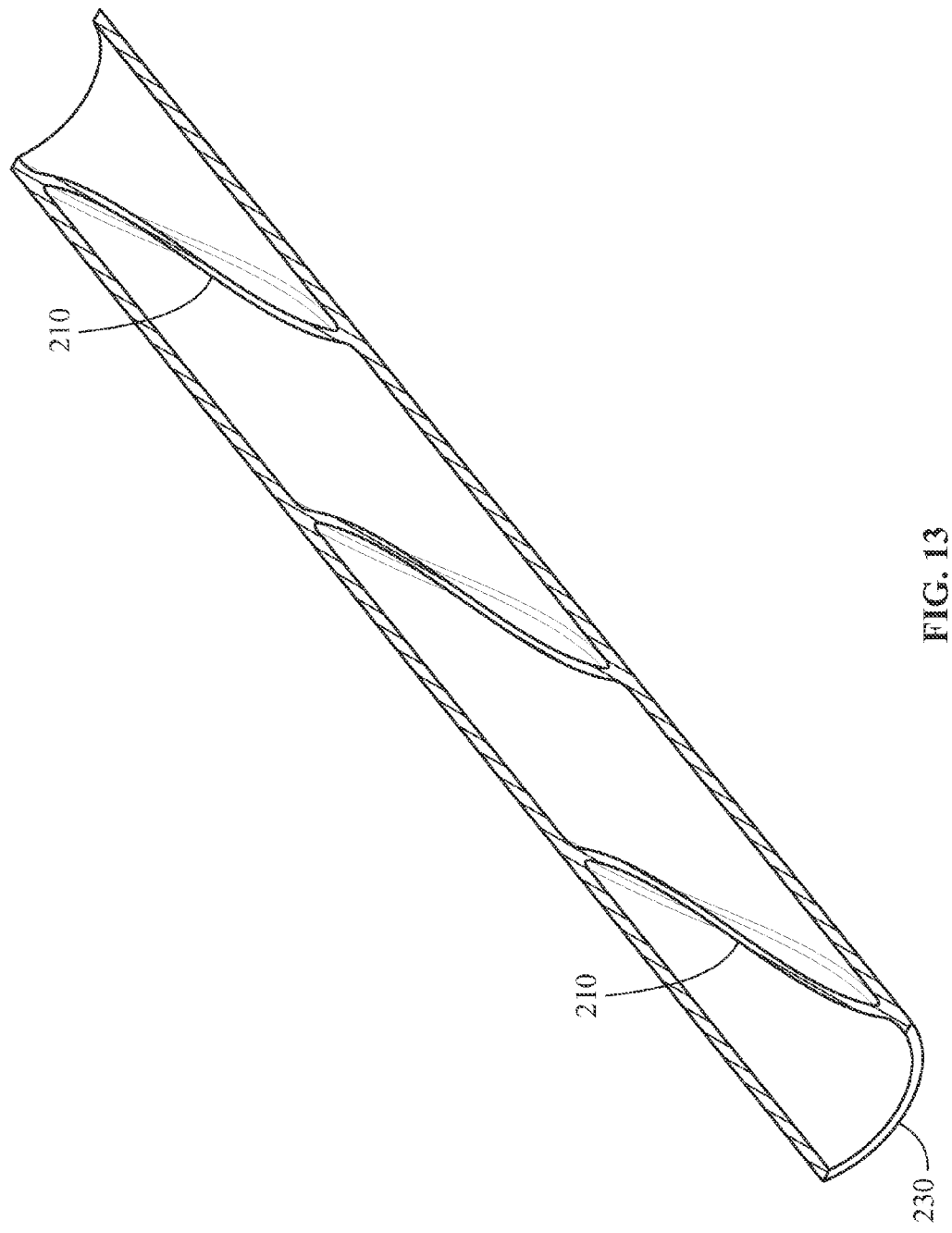

FIGS. 11-13 illustrate cross-sectional views along the axis of the roller 200 at various radial points that illustrate helically wrapping arms 210 within the roller 200. In one embodiment, the helix angle is such that the internal form or arm 210 makes a complete rotation about the central core 220 every twelve to thirty six inches of axial roller length for a two and a half inch diameter roller, and in one embodiment the helix angle is such that the arm 210 makes a complete rotation about every twenty-four inches of axial roller length. In another embodiment, the helix angle is such that the arm 210 makes a complete rotation about every sixty inches of axial roller length. In another embodiment, the helix angle is such that the arm 210 makes a complete rotation about every eighty-four inches of axial roller length. However, it will be appreciated that the angle of the helix and thus the axial distance to achieve a full rotation of internal form or arm 210 can vary depending on a variety of factors, including the diameter of the rollers 200, the overall length of the conveyor rollers 200, the number of arms 210 and the material of construction. In some embodiments, the use of helical arms 210 within the roller 200 adds strength that distributes weight angularly about the entire circumference of the roller 200. Exemplary embodiments may exhibit a flex modulus substantially greater than conventional steel. It will further be appreciated that one or more arms 210 can run straight without a helix depending upon the structural and strength requirements of the roller 200.

Other configurations of a conveyor roller 200 having one or more internal arms are also contemplated and can include multiple structural levels within the roller 200. Similarly, the manner in which one or more helical features are incorporated can also be varied in different embodiments.

Figure 14:
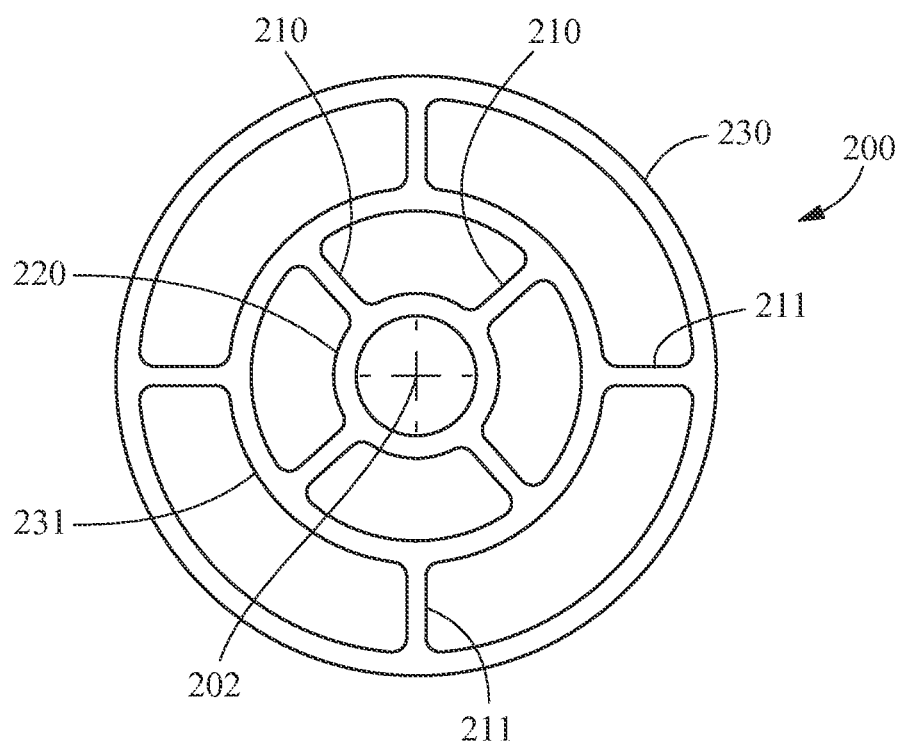
FIG. 14 shows an elevation view of an exemplary conveyor roller.

For example, in an alternative embodiment shown in FIG. 14, an end view of a conveyor roller 200 is illustrated. In this embodiment, the roller 200 again includes a central core 220 from which forms or arms 210 extend radially outward for supporting inner wall 231. In FIG. 14, the forms or arms 210 extend axially along the central core 220, but have little or no helical rotation about an axis, such as about longitudinal axis 202. In another embodiment, forms or arms 210 can helically rotate along longitudinal axis 202. The arms 210 end at an inner wall 231 that, like the central core 220, extends the length of the roller 200, with inner wall 231 surrounding central core 220. From the inner wall 231, a second set of arms 211 extends radially outward toward the outer wall 230 for supporting outer wall 230, with outer wall 230 surrounding central core 220 and inner wall 231. In this embodiment, the second set of arms 211 extend axially between the inner and outer walls 231, 230, and optionally wrap helically about the axis of the roller 200. It will be appreciated that conversely the inner arms 210 could wrap helically about the roller axis while the outer arms 211 are substantially straight. Alternatively, both sets of arms 210, 211 could be helical and the arms could wrap in either the same or opposing directions, while in yet another embodiment, neither set of arms are helically rotated. As further shown in FIG. 14, both core 220 and outer wall 230 are cylindrical and centered relative to longitudinal axis 202, although in other embodiments, the core and/or outer wall can define other geometries and/or one or both of the core and the outer wall can be non-centered for rotation relative to the rotational longitudinal axis.

It will thus be appreciated that a variety of different configurations can be employed in constructing a conveyor roller 200 to increase the open volume within the roller 200 (and thus decrease the overall weight) while still retaining sufficient strength to work for its intended purpose.

Regardless of the particular configuration, the conveyor roller 200 can be manufactured of any suitable material, including aluminum, investment casting, plastic and combinations of those and other materials by way of example. If thermoplastic materials are employed, high strength extrudable materials are preferred; one suitable such material includes acetal resins, but other materials may be used as well.

The use of an aluminum or a polymeric material provides a roller 200 that is significantly lighter than conventional steel rollers, although the conveyor rollers 200 in accordance with exemplary embodiments still retain similar strength characteristics of conventional steel rollers and can have strength properties that exceed such conventional steel rollers, including flex modulus and moment of inertia.

Extrusion from plastic or aluminum can also advantageously allow the roller 200 to be manufactured as a continuous piece that can be cut to any desired roller length as it leaves the extruder, such as extruder 501. As a result, rollers 200 can be easily manufactured to meet any desired custom conveyor width.

The rollers 200 can be of any desired diameter, although 2.5 inches and 3.5 inches are typical, which can be useful for employing the conveyor rollers 200 of exemplary embodiments in conjunction with otherwise conventional roller conveyor systems. The wall thickness of the arms 210, central core 220, and outer wall 230 can vary depending on a variety of factors, including the size of the roller, material of construction, configuration, and its intended end use. In one embodiment, a thermoplastic conveyor roller 200 having the configuration shown in FIG. 10 and a diameter of 2.5 inches can have a wall thickness for the arms 210, central core 220 and outer wall 230 in the range of about 0.125 inches to 0.25 inches, while an aluminum conveyor roller of the same diameter can have a wall thickness in the range of 0.060 inches to about 0.25 inches. Other wall thicknesses are contemplated and it will further be appreciated that the wall thickness of the arms 210 may not be the same as the central core 220 which can itself be the same or different from the outer wall 230. In other embodiments, wall thicknesses are contemplated that vary along the length of conveyor and/or vary as a function of the radially outward distance between the central core and/or inner wall and between the inner wall and the outer wall.

Returning to FIG. 10, the external surface of the outer wall 230 of the conveyor roller 200 can include a thin layer 240 of a high tack or nonslip material, such as SANTOPRENE®. The thickness of the high tack layer can vary, but in some embodiments is about 10 mils to about 40 mils (0.010 to 0.040 inch) thick. The use of a high tack layer 240 as a covering skin over the roller 200 can aid in reducing the driving force required to move the bale or other article being conveyed because of a greater friction force between it and the roller 200 by reducing slippage and by reducing slippage by increasing the friction between the roller 200 and the drive system 400 (FIG. 1).

Furthermore, where conveyor rollers 200 in accordance with exemplary embodiments are used in combination with the previously described bridge 100 that employs a braking system, the high tack layer 240 overlying the roller 200 can also aid in braking by increasing the friction force between the roller 200 and the first and second side walls 122, 124 of the bridge 100. It can also help to provide an additional non-skid surface to a person walking across the conveyor using the bridge; even with the use of multiple adjacent bridges 100, an individual's feet are still likely to be in some contact with the rollers 200. The application of the thin outer layer 240 to the outer wall 230 of the roller 200 can be accomplished through co-extrusion or any other suitable method of manufacture, such as dipping, vulcanization, powder coating, shrink wrap and epoxy, all by way of example.

Figure 15:
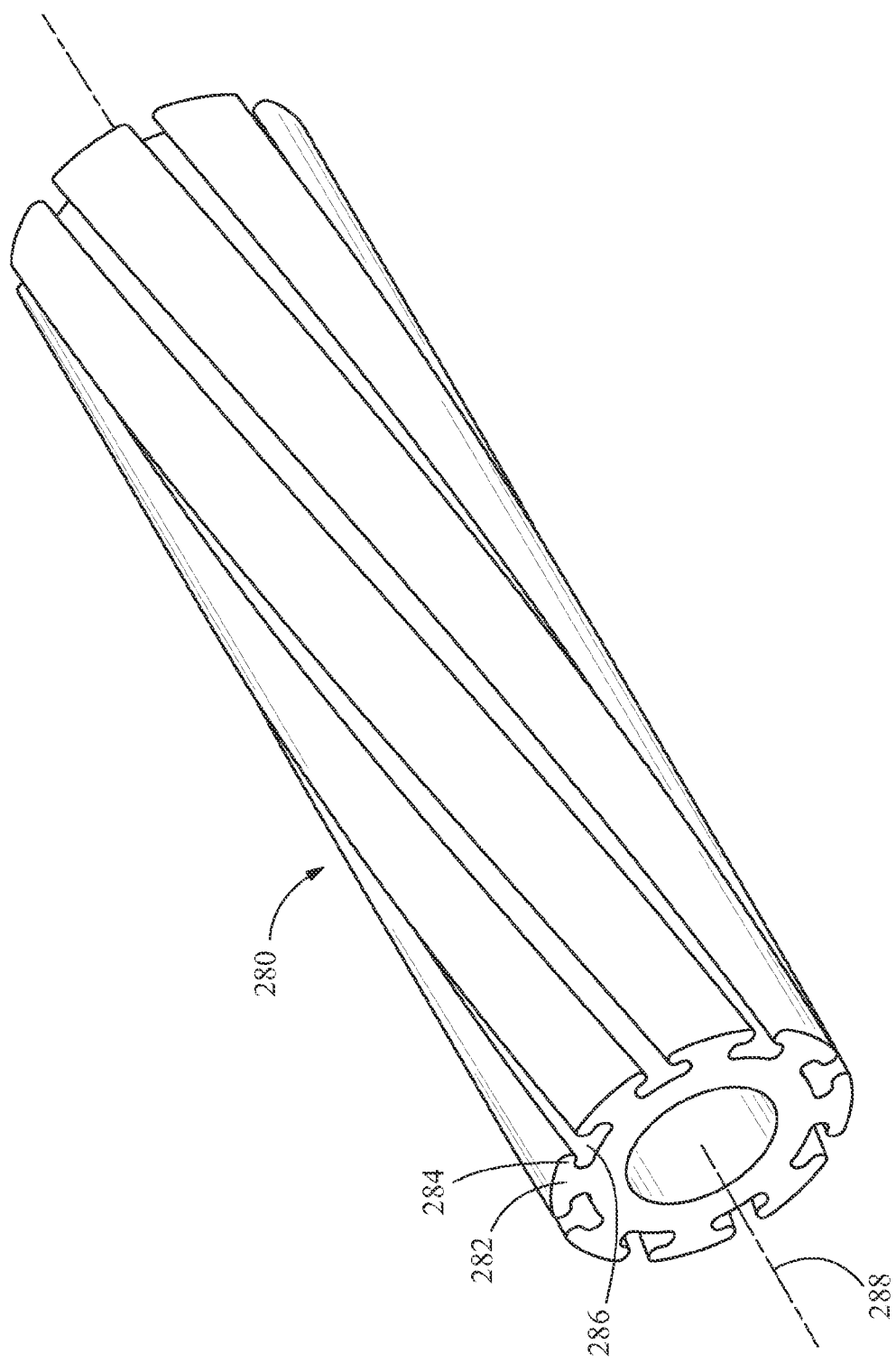
FIG. 15 shows a bearing received in a conveyor roller.

The conveyor rollers 200 can be attached to the conveyor frame by a pin 250 (FIG. 16) or some other device that extends into, inside of or otherwise through the central core 220 of the roller 200. In some embodiments, a bearing 280 (FIG. 15) can be positioned within the central core 220 (best seen in FIG. 10) to receive the pin 250 or to separately support roller 200 by a stud, spring loaded pin, or a well or other depression formed in the frame in which the bearing 280 rests. As shown in FIG. 15, bearing 280 includes a plurality of outwardly extending protrusions 282 having one or more flanges 284 extending substantially transverse to the protrusions 282. As further shown in FIG. 15, the combination of protrusions 282 and flanges 284 resembles a T-shape, with channels or grooves 286 providing weight savings while providing structural support. As yet further shown in FIG. 15, the T-shaped combination of protrusions 282 and flanges 284 extend along a helix relative to a longitudinal axis 288 of the bearing 280.

Figure 16:
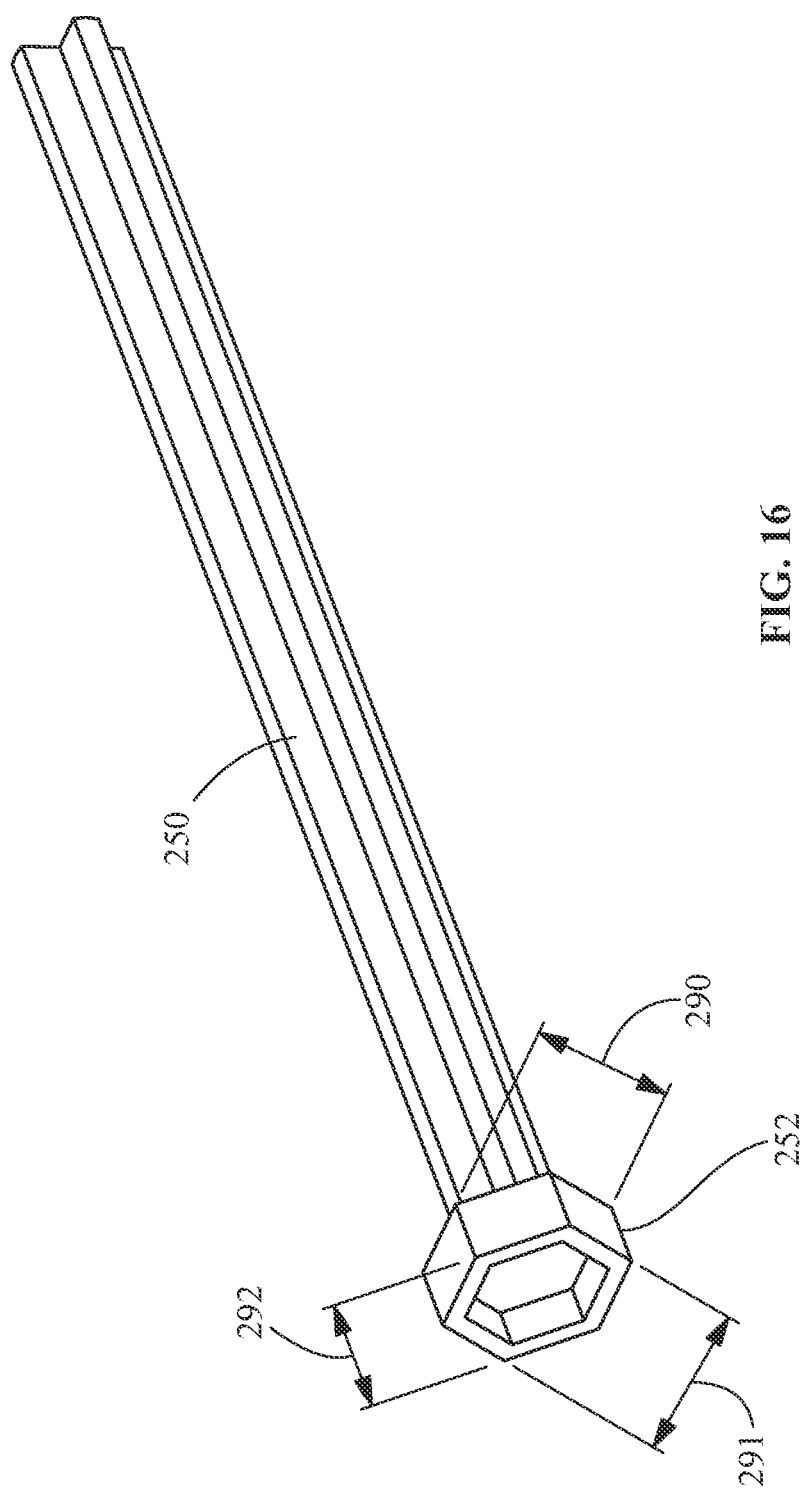
FIG. 16 shows an isometric view of an exemplary embodiment of a pin received in a conveyor roller.

If a pin is employed, the pin 250 can include a head 252 that can be received by the roller frame and that prevents the pin 250 from moving as the roller 200 rotates about it. In some embodiments, the pin 250 is formed with a hexagonal head such that the same pin 250 can be used with differently sized frame mountings. For example, the pin 250 can have a hexagonal head suitable for use with each of ⅝", 19/32" and 11/16" frame mountings by changing the side of the head 252 on which the pin 250 is seated in the frame mounting. In other words, as shown in FIG. 16, head 252 can have opposed sides or flats, such as a hexagonal shape having three opposed sides, each opposed side having a different corresponding distance 290, 291, 292 therebetween, permitting three different frame mounting distances. In an alternate embodiment, at least two of the opposed sides or flats are separated by a different corresponding distance.

In some embodiments, a single pin 250 extending entirely through the central core 220 of the conveyor roller 200 can be used. In other embodiments, two shorter pins 250 on opposing ends of the roller 200 can provide sufficient support without exhibiting sagging.

Figure 16A:
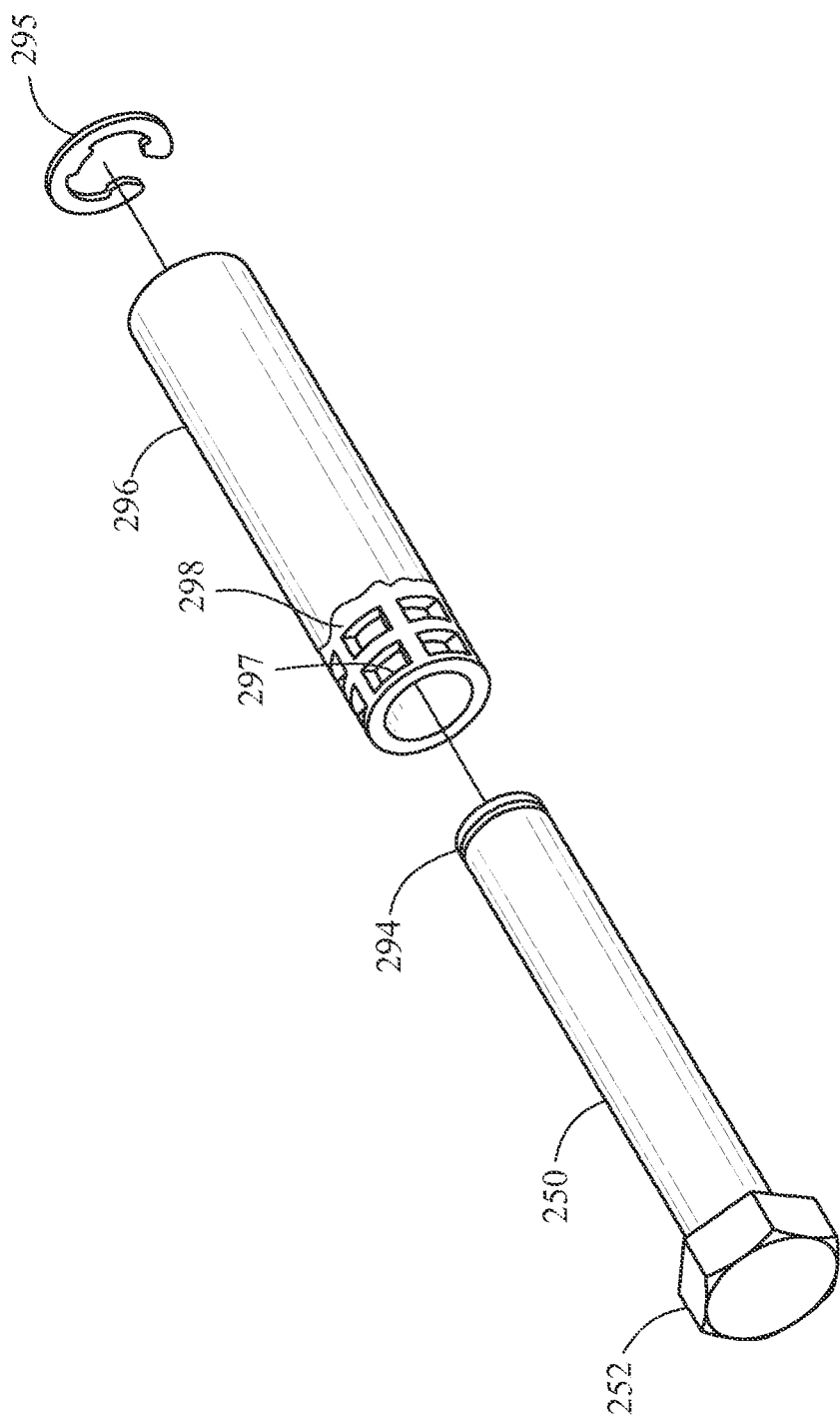
FIG. 16A shows an isometric view of an exemplary embodiment of a pin received in a conveyor roller.

The use of pins 250 having sleeve bearings 280 as axles inserted into the central core 220 of the roller 200 eliminates the need for ball bearings, a common point of failure with conventional metal rollers. The pins 250 and/or cylindrical sleeve bearings 280 can be made of any suitable material; in one embodiment, they are injection molded from a polymer such as polycarbonate or PVC material. In an embodiment, such as shown in FIG. 16A, the shaft of pin 250 is received in a sleeve 296. As further shown in FIG. 16A, the sleeve 296 includes a plurality of recesses 297 formed in the sleeve 296, resulting in an outer surface having a ribbed structure 298, saving weight while providing structural rigidity and support. The shaft of pin 250 includes a channel or groove 294 for mating with a retaining fastener 295 and retaining sleeve 296. In yet another embodiment, the pin 250 can be spring-loaded to accommodate other styles of frames on which the roller 200 is mounted.

Figure 17:
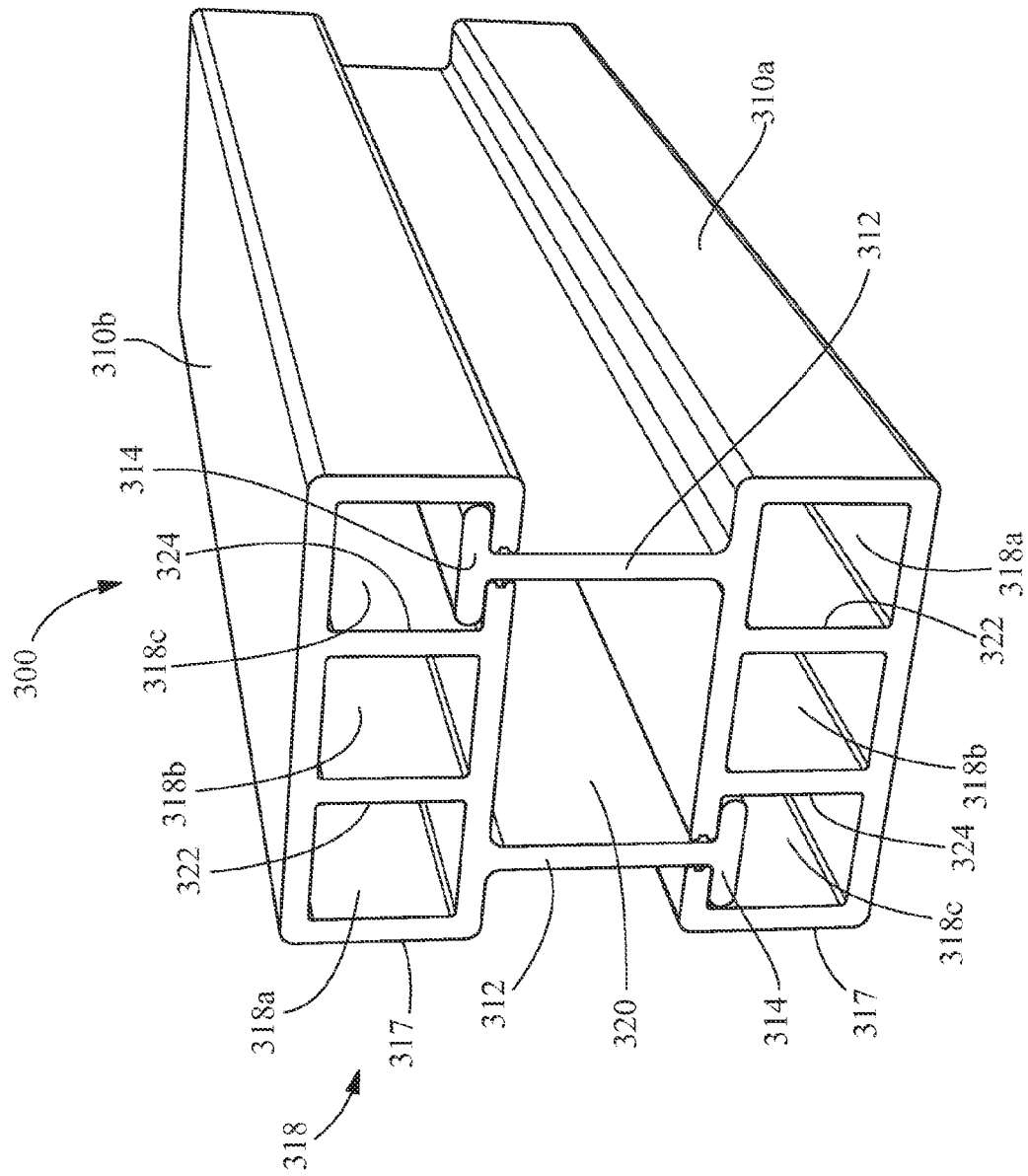
FIG. 17 shows an isometric view of an exemplary embodiment of an assembled lifter assembly.
Figure 18:
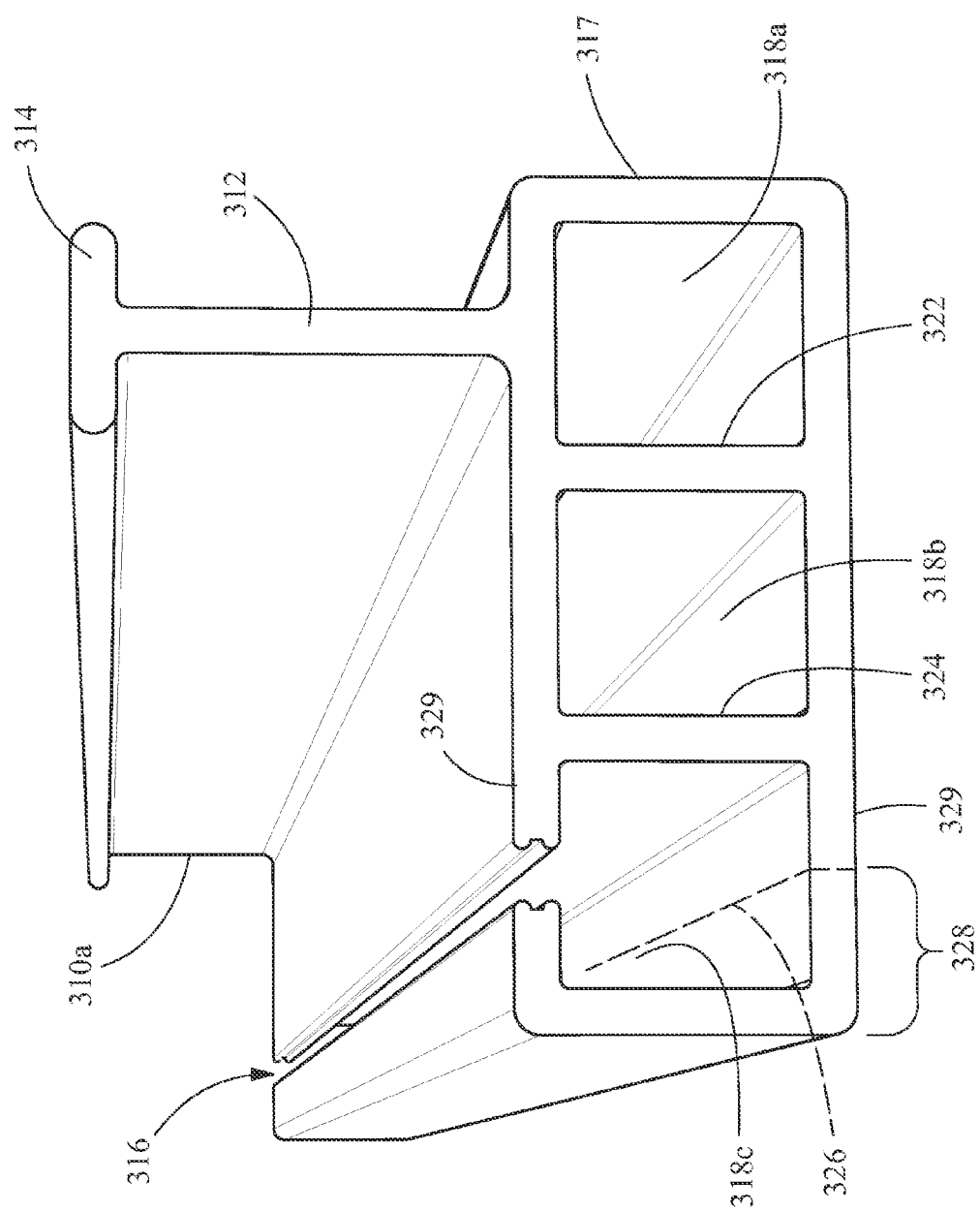
FIG. 18 shows a lifter segment of the lifter assembly of FIG. 17.
Figure 19:
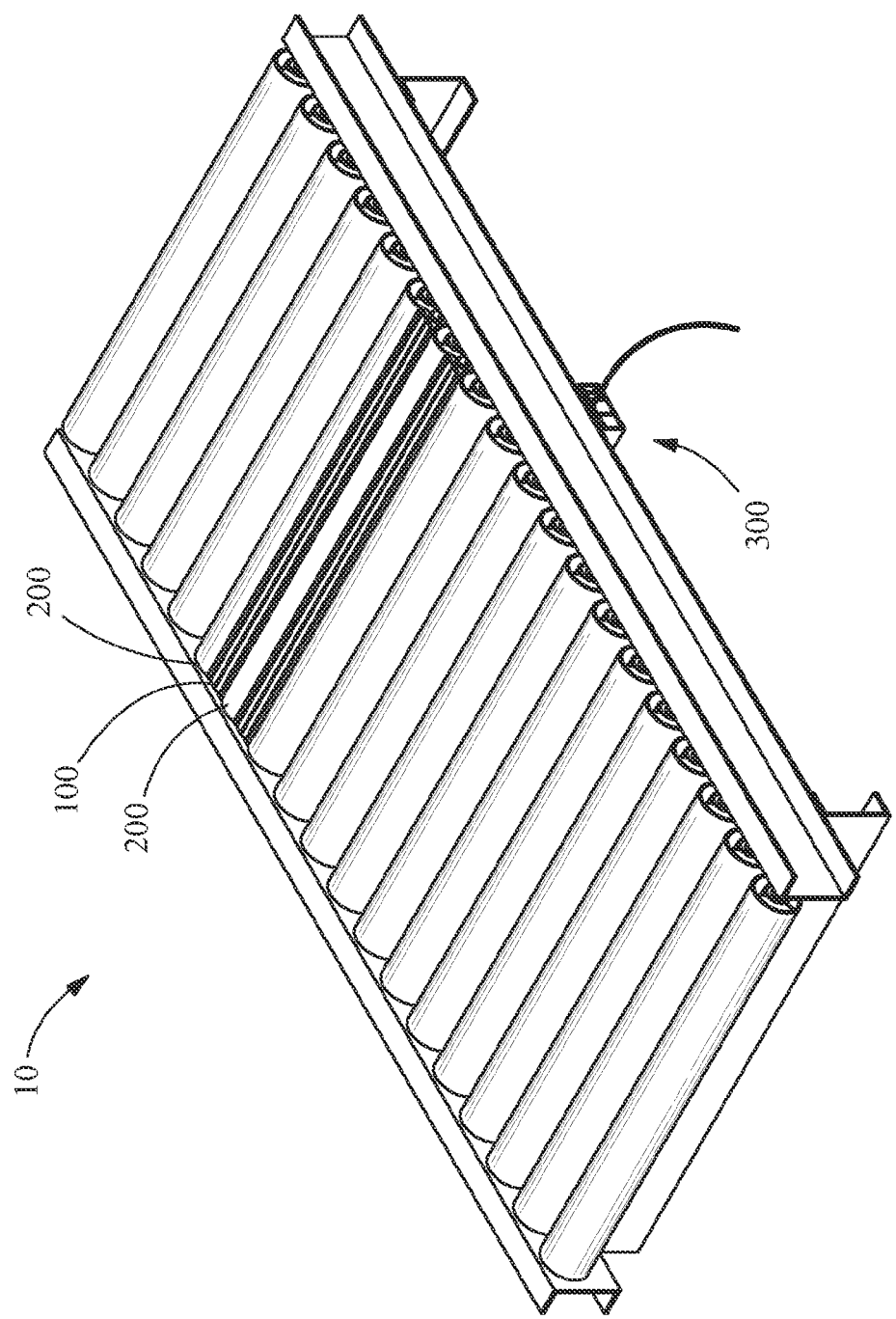
FIG. 19 shows a partial cutaway isometric view of an upper portion of an exemplary embodiment of a roller conveyor system.
Figure 20:
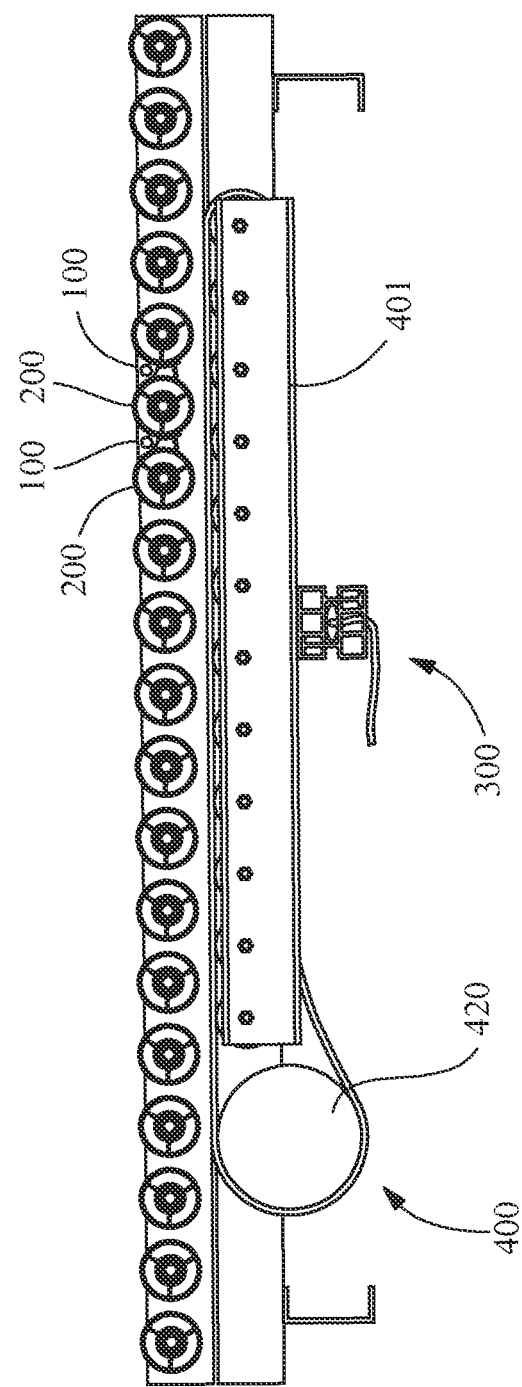
FIG. 20 shows a partial cutaway elevation view of an exemplary embodiment of a roller conveyor system.
Figure 21:
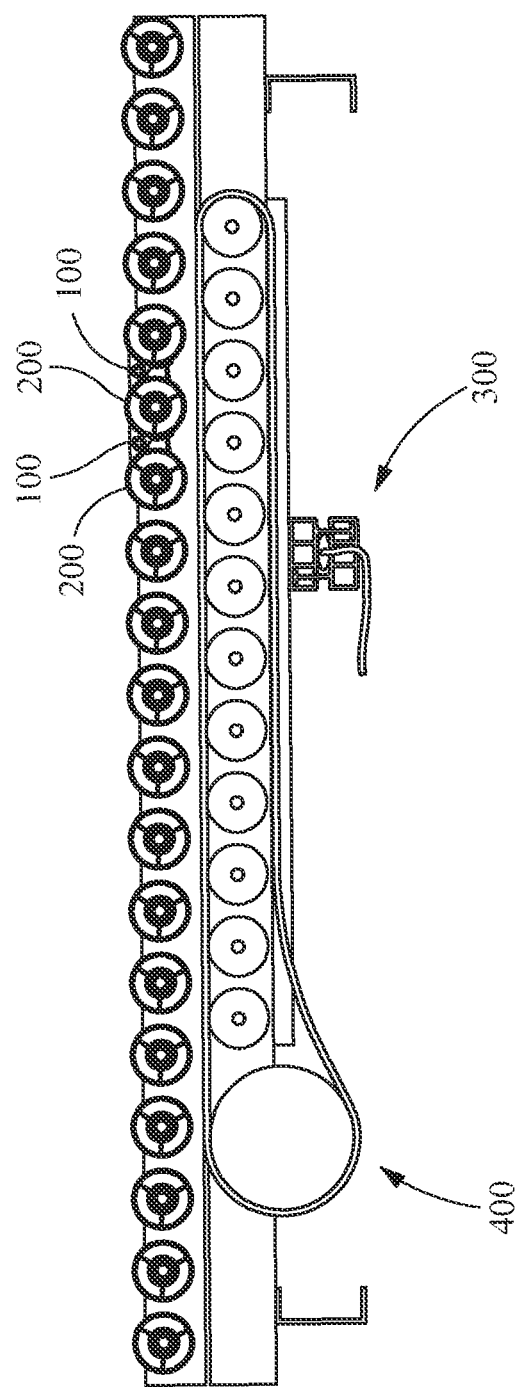
FIG. 21 shows a partial cutaway elevation view of the roller conveyor system of FIG. 20, with a lifter assembly in a retracted position.

Turning to FIGS. 17 and 18, a pneumatic lifter assembly 300 for use with a roller conveyor system 10 is illustrated. The lifter assembly 300 is constructed of two lifter segments 310a, 310b which can be identical and rotated around a longitudinal axis relative to one another. Advantageously, the lifter segments can be extruded as a continuous single length, then cut into individual lifter segments of any desired length for any particular application. In addition to pneumatics, hydraulics or other fluid systems can be used.

Referring to FIG. 18, each lifter segment 310a, 310b (only lifter segment 310a shown in FIG. 18) includes an arm 312 on one end extending away from a base 317, the lifter segment 310a, and having a travel stop 314 formed at the distal end of the arm 312, or the arm 312 terminating at travel stop 314. The arm 312 and travel stop 314 typically, but not necessarily, extend the entire length of the lifter segment 310a. On a same side, but opposite end of the base 317 of lifter segment 310a, a keyway opening 316 is formed for receiving an arm 312 and travel stop 314 of an opposing lifter segment 310b. FIG. 18 shows the base 317 including apertures 318a, 318b, 318c formed therein, with reinforcing member 322 separating apertures 318a, 318b and reinforcing member 322 separating apertures 318b, 318c. Aperture 318c of each lifter segment 310a, 310b is configured to receive a corresponding travel stop 314 which is secured by the arm 312. Arm 312 is slidably movable between keyway openings 316. Apertures 318a, 318b are provided to further reduce the weight of lifter segments 310a, 310b, with reinforcing members 322, 324 providing structural support during operation of lifter assembly 300 (FIG. 17). It is to be understood that in one embodiment, aperture 318a can be the only aperture formed in base 317 and that the aperture can be sized differently. In other embodiments, there can be two or more reinforcement members subdividing aperture 318 (FIG. 17) into smaller apertures 318a, 318b, etc., and that those apertures can be sized differently. In one embodiment, instead of the travel stop, such as travel stop 314 slidably moving in a vertical direction within or inside of an aperture, such as aperture 318c, the travel stop could be exterior of the lifter segment. For example, as optionally shown in FIG. 18, a cutting line 326 can be formed in the lifter segment, resulting in a removed portion 328 from the lifter segment, leaving behind outwardly extending flanges 329 and reinforcing member 324, such that the travel stop 314 would be limited to travel between the flanges 329. However, such an arrangement may not be desirable due to an arrangement of moving parts exterior of an enclosure, such as a base.

It is to be understood that arm 312 and keyway opening 316, as well as aperture 318c and travel stop 314 are to be sized relative to one another to permit lifter segments 310a, 310b to be operatively connected therebetween for smooth operation (i.e., slidable movement of arm 312 within keyway opening 316, and slidable movement of travel stop 314 within aperture 318c; such movement occurring without binding). Such sizing must also account for the materials used, loading considerations, amount of travel required, and the like.

Returning to FIG. 17, the lifter assembly 300 is shown with both lifter segments 310a, 310b assembled having lifter segments 310a, 310b. The arms 312 of each lifter segment have been secured in the keyway opening 316 of the other lifter segment by sliding, as previously discussed. The assembled lifter segments 310a, 310b form a lifting channel or chamber 320 in the lifter assembly 300 defined by corresponding bases 317 and arms 312, with chamber 320 configured for receiving an air bladder 330 (shown in FIG. 1 and omitted here for clarity) that can be sealed at one end and connected to a compressed gas source at the other end.

Figure 22:
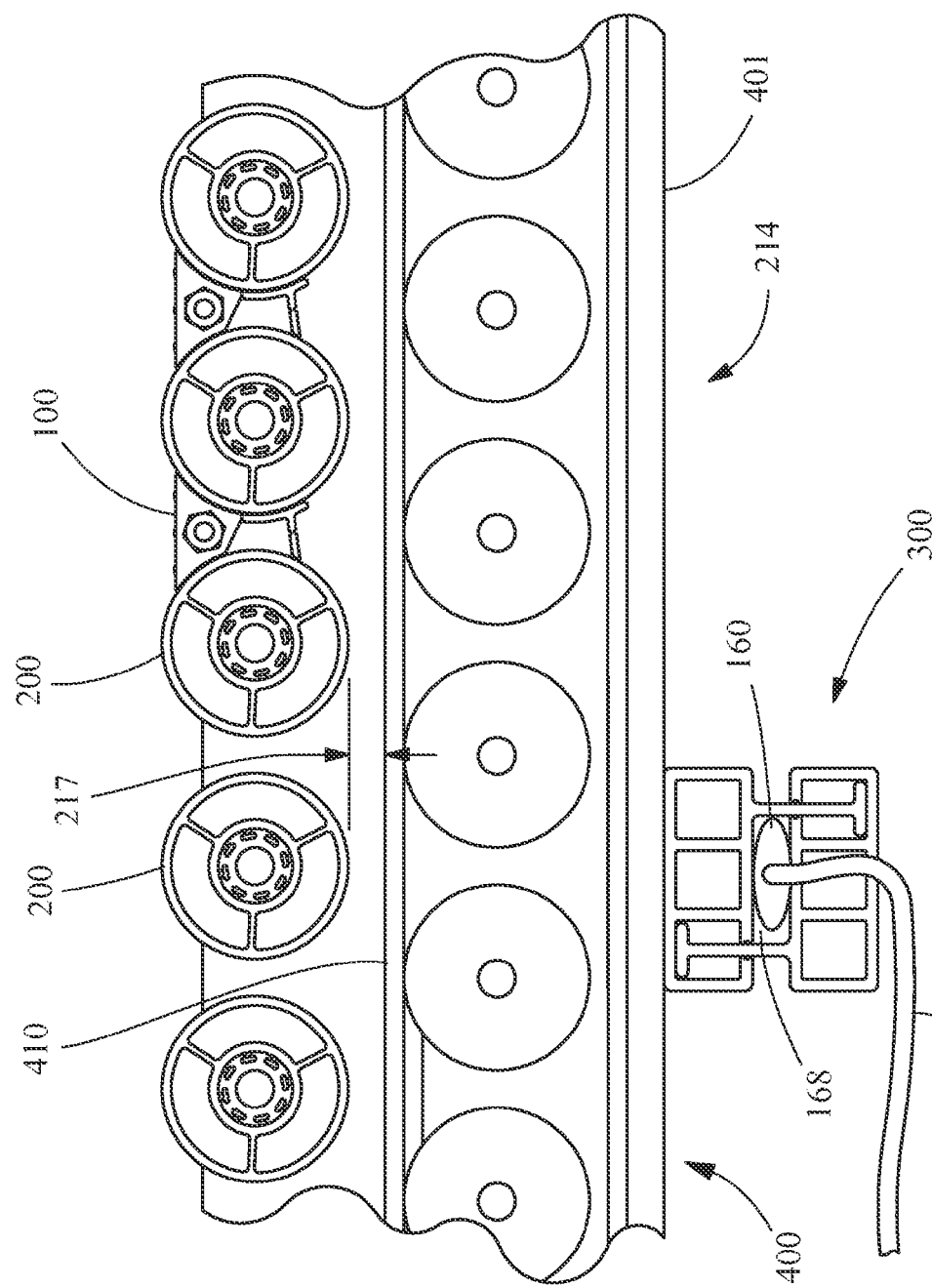
FIG. 22 shows an enlarged partial cutaway elevation view of the roller conveyor system of FIG. 20.
Figure 23:
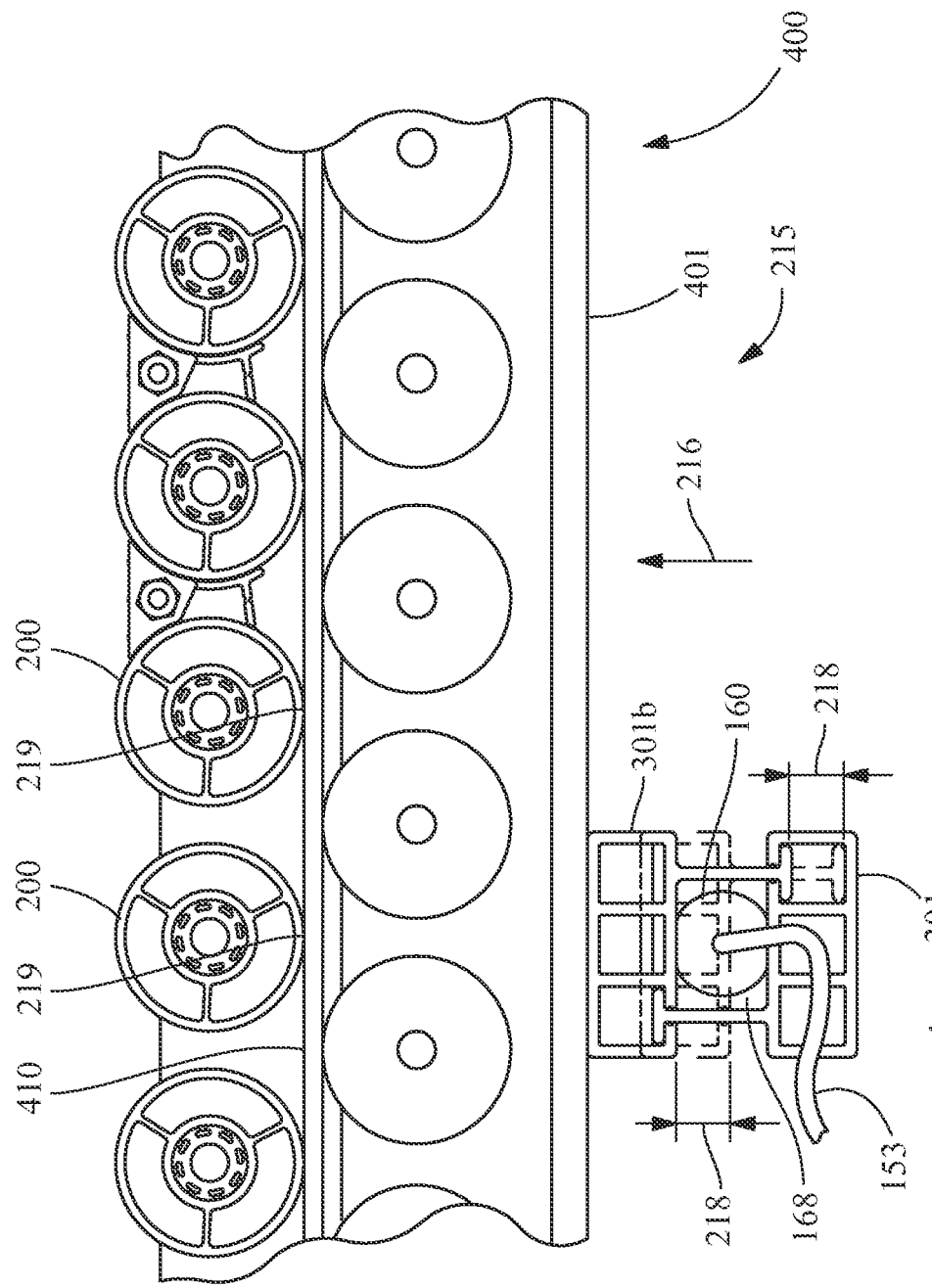
FIG. 23 shows an enlarged partial cutaway elevation view of the roller conveyor system of FIG. 20, except with a lifter assembly in an extended position.

As such, as shown in FIGS. 19-23, the lifter assembly 300 can be actuated between a retracted or lowered position 214 and an extended position 215, depending on whether the air bladder 330 is in a collapsed state or an expanded state, the positions 214, 215 controlled by the flow of pressurized air into the bladder. In the retracted or lowered position 214 (shown in FIG. 22), the drive belt 410 is separated from the plurality of conveyor rollers 200 by a distance 217, such that conveyor rollers 200 are free to rotate independently of the drive belt 410 (and drive system 400). In the lifter assembly's extended position 215 (shown in FIGS. 17 and 23), pressurized gas expands elastic air bladder 160, urging the lifter segment 310b into slidable vertical movement a distance 218, which distance 218 being greater than distance 217, in a direction 216 away from 310a lifter segment. As a result, the lifter segment 310b is brought into abutting contact with the frame 401 of the drive system 400 (FIG. 1), lifting the frame 401 such that belt 410 is brought into tangential contact with conveyor rollers 200 at points 219 (FIG. 23). As a result, upon drive system 400 being activated such that drive belt 410 is urged into movement about drive roller 420 (FIG. 20), the conveyor rollers 200 are similarly urged into rotational movement as previously discussed.

When activation of the drive system 400 is no longer required, the flow of pressurized air can be disrupted and the amount of pressurized air in the bladder 330 is sufficiently reduced, the bladder 330 can return to its collapsed state. As a result, the lifter segment 310b returns to its retracted position 214 and the lifter segment 310b is not longer in abutting contact with the frame 401 of the drive system 400 (FIG. 1). Additionally, drive belt 410 of the drive system returns to the separation distance 217 from corresponding conveyor rollers 200 (FIG. 22).

Lifter assemblies in accordance with exemplary embodiments can be used to replace steel C-channel lifters used in conventional roller conveyor systems and the numerous associated drawbacks therewith, including reducing exposure of the air hose. Protecting the air hose from wear caused by the drive belt can reduce the occurrence of air line leaks, reducing operating costs and improving overall performance of the system as a whole. Lifter assemblies in accordance with exemplary embodiments also provide a bearing surface that creates less drag, further reducing energy consumption. The lifter assembly 300 can be manufactured from any suitable material, and can be of an extrudable material including aluminum or thermoplastic, making it lightweight and further reducing energy requirements, particularly if used in conjunction with the conveyor rollers 200 described herein.

Turning to FIGS. 24-25 and 27-36 (with FIGS. 26A-26E directed to exemplary embodiments of tubular structures that can be manufactured from an exemplary apparatus of FIGS. 24-25 and 27-36) an apparatus 500 for extruding multiwall tubular structures, such as conveyor rollers 200 having helically extending forms or arms 210 relative to a longitudinal axis 202 (FIG. 10) or drive system rollers 420 for use with a roller conveyor system 10 (FIG. 1) is illustrated.

It is to be understood that such extruded multiwall tubular structures of the present application, which include helically extending arms or forms, are not limited to cylindrical rollers of roller conveyor systems, but are used in many other industries, such as vacuum cleaners to automobile transmissions of varying materials and substrates (such as aluminum, polymers, brass, lead, zinc, bronze, babbitt or bearing metal, malleable steels, alloy steels, or other suitable material for the intended application). Such helically extending forms can include, but are not limited to a single inside diameter (ID), multiple inside diameters (ID's), ribs, gear teeth, bearing grooves, splines, fins, oil grooves or the like) affixed to the outside geometry (OG) with the internal helical forms extending clockwise or counterclockwise along the length of the extrusion as the extrusion is formed. However, unlike conventional multi-process procedures utilized in industry to provide the above-mentioned features, the extruded multiwall tubular structures, including the internal helically extending arm(s) or form(s) can be produced in a single pass extrusion. The term single pass extrusion is intended to mean that the multiwall tubular structure, including the internal helically extending arm(s) or form(s) is created solely by virtue of the plastic state material flowing through the dies, forming the structure, which structure is of unitary or one piece construction. Stated another way, no additional forces (axial, torsional or the like) associated with the manufacture of the structure are applied to the extruded structure subsequent to the structure exiting the extruder and being last contacted by the dies, such as at least one of the outer wall and the form(s) of the structure. Stated yet another way, the structure, such as at least one of the outer wall and the form(s) of the structure, lacks residual strains, as a result of stress created by the manufacturing process of the structure, subsequent to the structure exiting the extruder and being last contacted by the dies. For purposes herein, manufacture of the multiwall tubular structure subsequent to extrusion from the dies would include, for example, the application of forces resulting in a change to the cross sectional profile of the structure or resulting in a change in the orientation of the cross sectional profile relative to its longitudinal axis. For purposes herein, the following operations are not considered to be associated with the manufacture of the structure, such as handling or otherwise arranging the formed structure, such as for storage or shipping, cutting the structure to desired lengths, applying coatings or other surface treatments and the like. In one embodiment, surface texture of the multiwall tubular structure can be achieved by the extrusion dies.

The lack of such strains, as a result of stress created by the manufacturing process of the tubular structure, subsequent to exiting the dies of the extruding apparatus of the present application may result in improved material strength.

Figure 24:
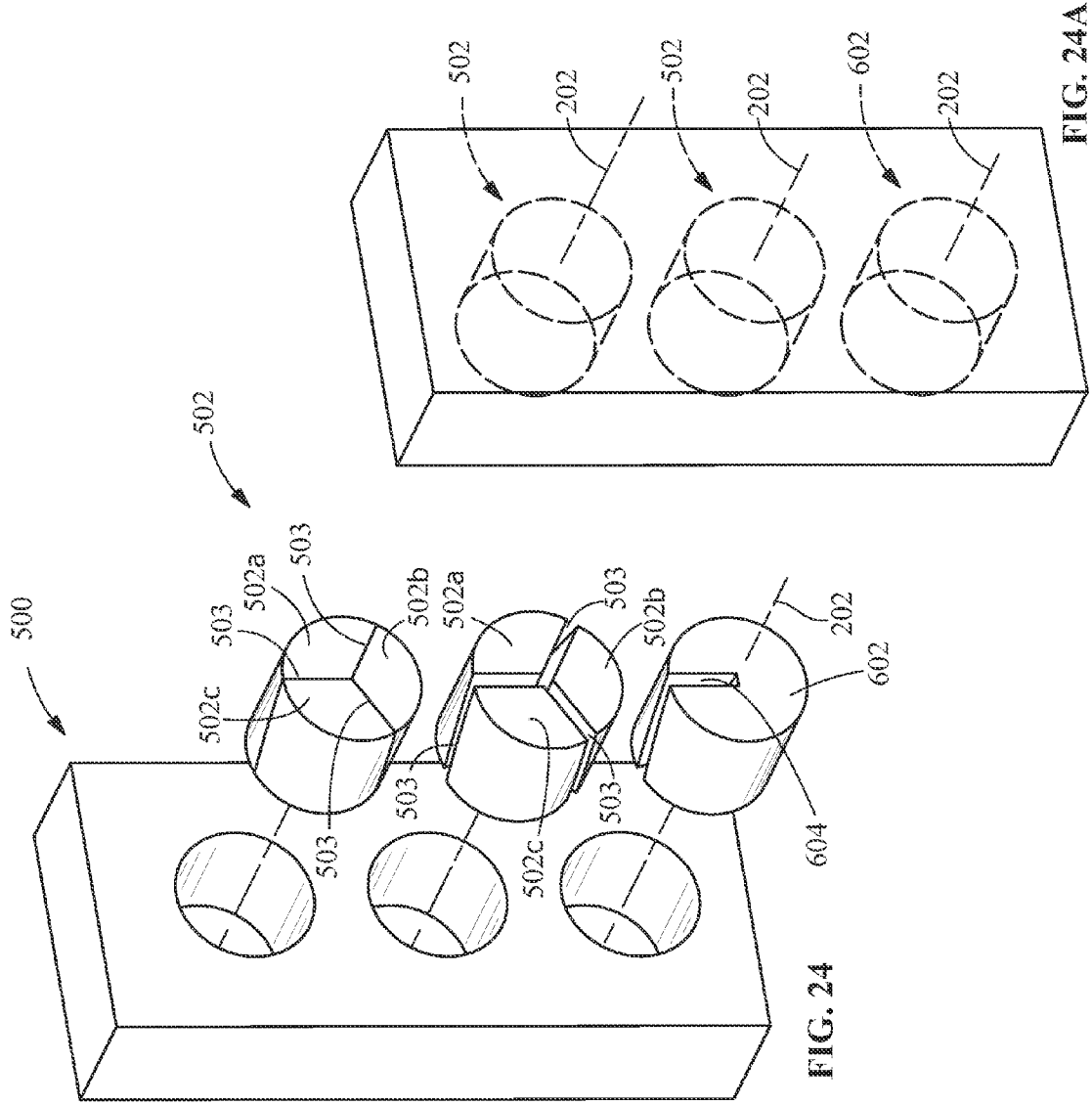

It is appreciated that extrusion apparatus 500, as generally shown in FIG. 24 includes an extruder 501 of known construction, which is not further discussed herein.

FIGS. 24 and 24A show one exemplary embodiment of the present application, in which a die 502 is split or divided into separate pieces or portions or segments, such as die portions 502a, 502b, 502c. This exemplary embodiment is depicted in the upper two dies 502 as shown in FIGS. 24 and 24A. By providing die portions 502a, 502b, 502c, nonplanar cavities or channels 503 can be machined generally longitudinally relative to the longitudinal axis 202 in adjacent facing surfaces of channels 503 of die portions 502a, 502b, 502c, permitting the creation of helically extending geometries of channels 503 once die portions 502a, 502b, 502c are reassembled for production. Injection molding technology is then applied such that flow of plastic state material between the machined facing surfaces of channels 503 will be formed between the corresponding mandrel portions or die portions 502a, 502b, 502c of the extrusion die 502 in order to create extruded multiwall tubular structures, such as conveyor rollers 200 (e.g., FIGS. 10-13) having forms or arms 210 extending in helical geometries relative to the longitudinal axis 202 (FIGS. 10, 24A) once dies 502 are reassembled for production. In another embodiment, two or more than three die portions may be utilized.

Stated another way, in an exemplary embodiment of the present application as shown in FIGS. 24 and 24A, die 502, also referred to as a split cavity die, are separated into two or more die portions (three die portions 502a, 502b, 502c are shown in one embodiment in FIGS. 24 and 24A) in such a way that opposed surfaces of the die portions can be machined in more than one plane, such that when the split cavity dies or die portions are reassembled, forming internal cavities or facing surfaces of channels 503 between adjacent die portions, a plastic state material will flow through the channels of the die portions during the extrusion process and continuously follow the contour of the die geometry and form a helical element within a tube or cylinder.

In another embodiment, such as further shown in FIGS. 24 and 24A, a nonplanar channel 604 is formed in a die 602, which channel 604 generally extends along the longitudinal axis 202 of the die such that a single helically extending form is created in a multiwall tubular structure, such as similar to a single arm 210 formed in conveyor rollers 200 (FIGS. 10-13) as previously discussed. In other words, instead of splitting or dividing a die into multiple die portions separated by corresponding channels, the single piece die 602 utilizes machined nonplanar facing sides of the nonplanar channel 604 to create the helically extending arm or form. In one embodiment, more than one channel 604 is formed in die 602.

Machining of the surfaces defining a channel of the reassembled die portions or of the opposed surfaces defining a channel of a single die as shown in FIGS. 24 and 24A can be achieved by electrical discharge machining (EDM), grinding or other suitable material removal method or technique to create the nonplanar surface. In addition, suitable surface finishes for the extruded structure can be created during machining of the channel surfaces.

For purposes of the present application, the terms die, die portion and mandrel, mandrel portion and the like may be used interchangeably.

The present application allows for the otherwise costly, multi-step, and time-consuming process of incorporating a helical embodiment within a tube or cylinder to be done in a single step via an extrusion process. Historically, the use of extrusion technologies to create a helix within a tube or cylinder has been accomplished in a multi-phase operation. One such method uses such technology as making two separate and individual tube or cylinder pieces and combining them together in a secondary operation.

Figure 37:
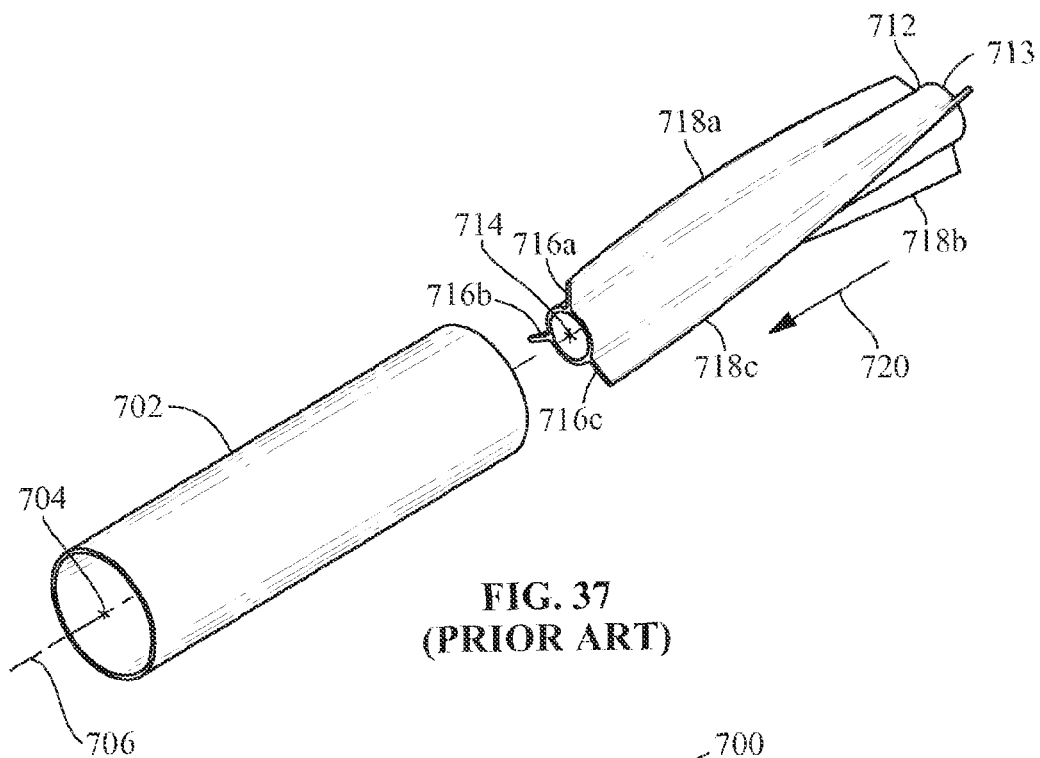
FIG. 37 shows an exploded view of a prior art assembly of manufacture of a helical element within a tube.

However, in addition to cost and expenditure of additional time compared to other methods, multi-step processing may have other disadvantages associated with components involving rotational movement, such as nonconcentricity, such as further discussed herein. For example, as shown in a conventional multi-step process of FIGS. 37 and 38 for respective pre-assembled and assembled conditions, a roller 700 includes a cylindrical, and preferably circular tube portion 702 having a center 704 and a longitudinal axis 706 which is coincident with center 704. As further shown in FIGS. 37 and 38, a core portion 712 includes a body 713 having a center 714, from which body 713 outwardly extend forms or arms 716a, 716b, 716c that terminate at respective ends 718a, 718b, 718c. As further shown in FIG. 37, once tube portion 702 and core portion 712 are axially aligned, core portion 712 is urged in a movement direction 720 relative to tube portion 702, which movement direction 720 being parallel to longitudinal axis 706, until core portion 712 is inserted inside of tube portion 702, forming roller 700.

Figure 38:
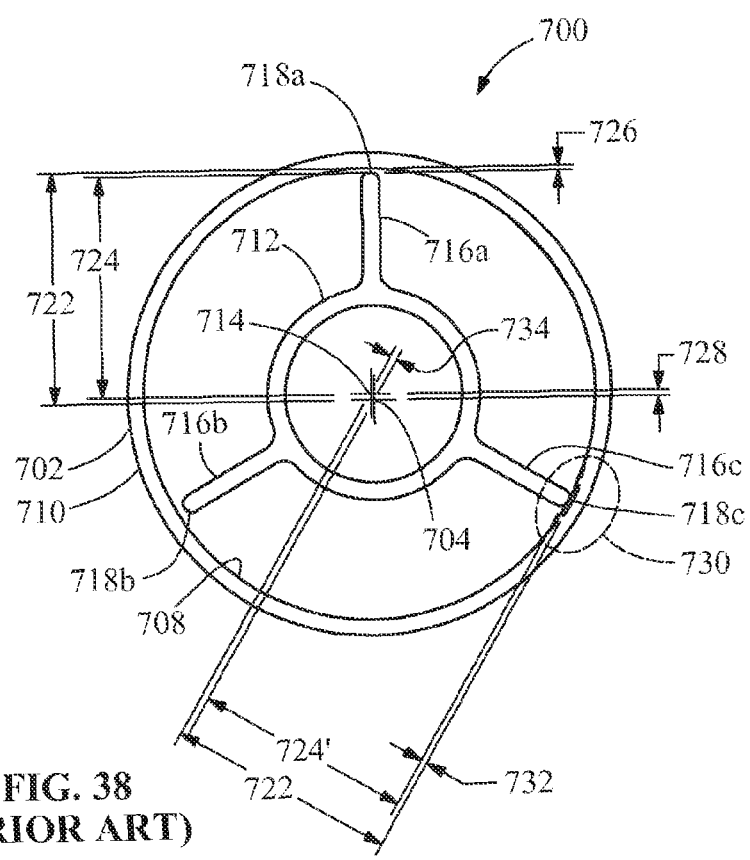
FIG. 38 shows an end view of an assembled prior art assembly of manufacture of FIG. 37.

FIG. 38 shows an end view of the assembled roller 700 that is perpendicular to longitudinal axis 706. Assembly of tube portion 702 with core portion 712 may result in respective centers 704, 714 being misaligned, which can also be characterized as core portion 712 being nonconcentric with tube portion 702. For example, as further shown in FIG. 38, a distance 722 between center 704 and an inner surface 708 of tube portion 702 may be greater than a distance 724 between center 714 and end 718a of core portion 712, resulting in formation of a gap 726 between end 718a of core portion 712 and inner surface 708 of tube portion 702. In order to remove gap 726, which is desirable in order for form or arm 716a to provide structural support for tube portion 702 along end 718a of core portion 712 (and without deforming tube portion 702), a nonconcentric distance 728 results between center 714 of core portion 712 and center 704 of tube portion 702. It is to be understood that in addition to or alternately of gap 726, one or more of corresponding gap(s) may exist between respective ends 718b, 718c of forms or arms 716b, 716c and inner surface 708 of tube portion 702 that may result in an increase of the gap or nonconcentric distance between center 714 of core portion 712 and center 704 of tube portion 702.

Conversely, a distance 722 between center 704 and inner surface 708 of tube portion 702 may be less than a distance 724' between center 714 and end 718c of core portion 712, resulting in formation of an interference region 730 between end 718c of core portion 712 and inner surface 708 of tube portion 702, resulting in a movement 732. That is, for proper operation of roller 700, end 718c of form or arm 716c should provide structural support for tube portion 702 associated with interference region 730. As a result, core portion 712 is urged to move a distance 734 between center 714 of core portion 712 and center 704 of tube portion 702. It is to be understood that in addition to or alternately of movement 732, one or more of corresponding movement(s) may exist between respective ends 718a, 718b of forms or arms 716a, 716b of core portion 712 and inner surface 708 of tube portion 702 that may result in an increase of the nonconcentric distance between center 714 of core portion 712 and center 704 of tube portion 702.

It is to be understood that one or more of a combination of gap(s) and/or movement(s) may act between respective ends 718a, 718b, 718c of forms or arms 716a, 716b, 716c of core portion 712 and inner surface 708 of tube portion 702 to determine the nonconcentric distance between center 714 of core portion 712 and center 704 of tube portion 702. In one embodiment, less than three forms or arms 716 may be used. In another embodiment, more than three forms or arms 716 may be used.

Other methods negatively affecting alternative methods of construction may include inconsistent wall thickness of one or more of cylindrical tube portion 702 and core portion 712, deformation of one or more of forms or arms 716, and variation of curvature of the external surface of cylindrical tube portion 702, such as "flat spots".

It is appreciated that due to the novel construction techniques associated with the present application, deviations or changes of concentricity of the resulting extrusions are prevented.

Figure 25:
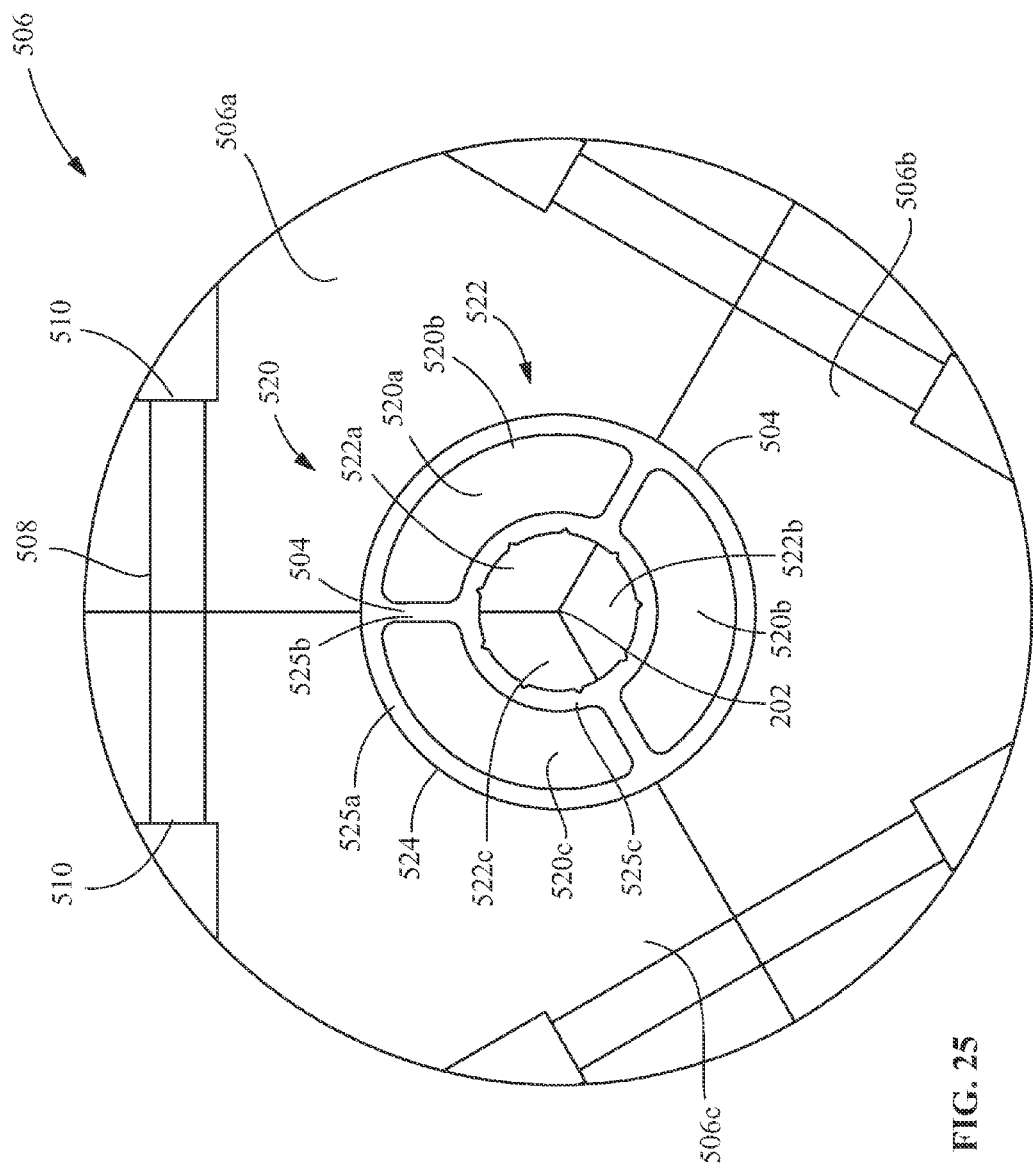
FIG. 25 shows an elevation view of an end of exemplary embodiment of extrusion dies for producing a multiwall tubular structure.
Figure 34:
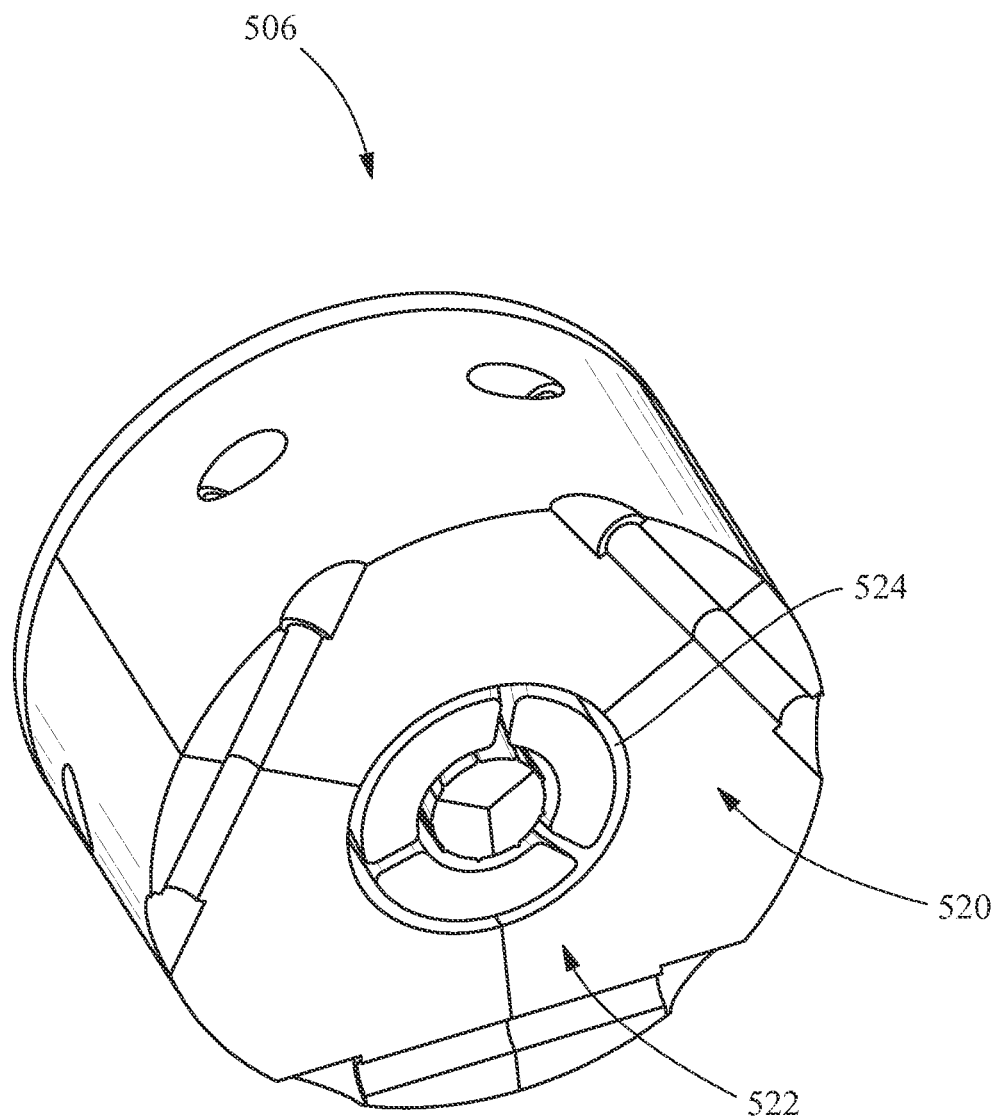
FIG. 34 shows an isometric view of the extrusion dies of FIG. 25.

FIG. 25 shows an assembled extrusion die set or extrusion die 506 comprising die portions 506a, 506b, 506c each including passageways 508 having receiving surfaces 510 for receiving fasteners (not shown) to secure the die portions in contact with each other. The passageways 508 shown are for receiving pins, however other suitable fastening arrangements such as keys, cams, taper locks, dove-tails or other arrangements for forming suitable joints, threads, welds, or other suitable constructions or techniques can be utilized. As further shown in FIG. 25, die 520 is surrounded by die 506, comprising die portions 520a, 520b, 520c. As yet further shown in FIG. 25, an extrusion die set or extrusion die 522, which is surrounded by mandrel pin or die 520, optionally comprises die portions 522a, 522b, 522c. The assembled sets of dies 506, 520, 522, which are generally spaced apart from each other and in fluid communication with each other, defining an extrusion outline 524, such as shown in FIG. 25 including extrusion portions 525a, 525b, 525c that are in fluid communication with each other and can be used to create an extruded multiwall tubular structure, such as for conveyor roller 200 in FIG. 10 having a longitudinal axis 202. In this embodiment, extrusion portion 525b corresponds to helically extending arm or form 210 (FIG. 10). FIG. 34 shows a three-dimensional isometric view of the assembled set of extrusion dies 506, 520 and 522 and resulting extrusion outline 524.

FIG. 25 shows the outer facing of the mandrels or dies 506 corresponding to the exit point of the extruded material. In this embodiment, a center circular mandrel pin or die 522 is shown as a single piece, although die 522 can be constructed from multiple components, such as die portions 522a, 522b, 522c and of varying geometries, such as triangular, square, oval, or multiple circles or geometric shapes. In one embodiment, a centered mandrel pin or die 522 could be concentric relative to the tube or cylinder to be extruded. Alternatively, the mandrel pin or die 522 could be off-center (non-concentric) or non-existent such that the helical ribs or elements or forms, such as extrusion portion 525b (FIG. 25) generally extend toward each other. The internal and external components and geometries of the mandrel pin or die can be shaped to meet the needs of the end user. For each embodiment, the present application facilitates a helical formation within a desired geometric tube or cylinder in a single operation via an extrusion process. In one embodiment, the helical ribs or elements or forms, such as formed by extrusion portion 525b (FIG. 25) can extend into close proximity with each other or alternately, into contact with each other, forming a focal point. See FIGS. 26A-26E for additional exemplary embodiments. While FIG. 26A is the only FIG. of FIGS. 26A-26E showing a helical element or form or arm, such as defined by extrusion portion 525b extending between an interior geometry defined by extrusion portion 525c (box) and an outer geometry defined by extrusion portion 525a, each of the other embodiments of FIGS. 26B-26E can also include a helical element or form extending between a corresponding interior geometry and exterior geometry, but are not shown for purposes of clarity. It is to be understood that other geometric arrangements incorporating one or more helical elements extending generally along the length of and within a tube or cylinder formed by a single-pass extrusion process fall within the scope of the present application.

Figure 35:
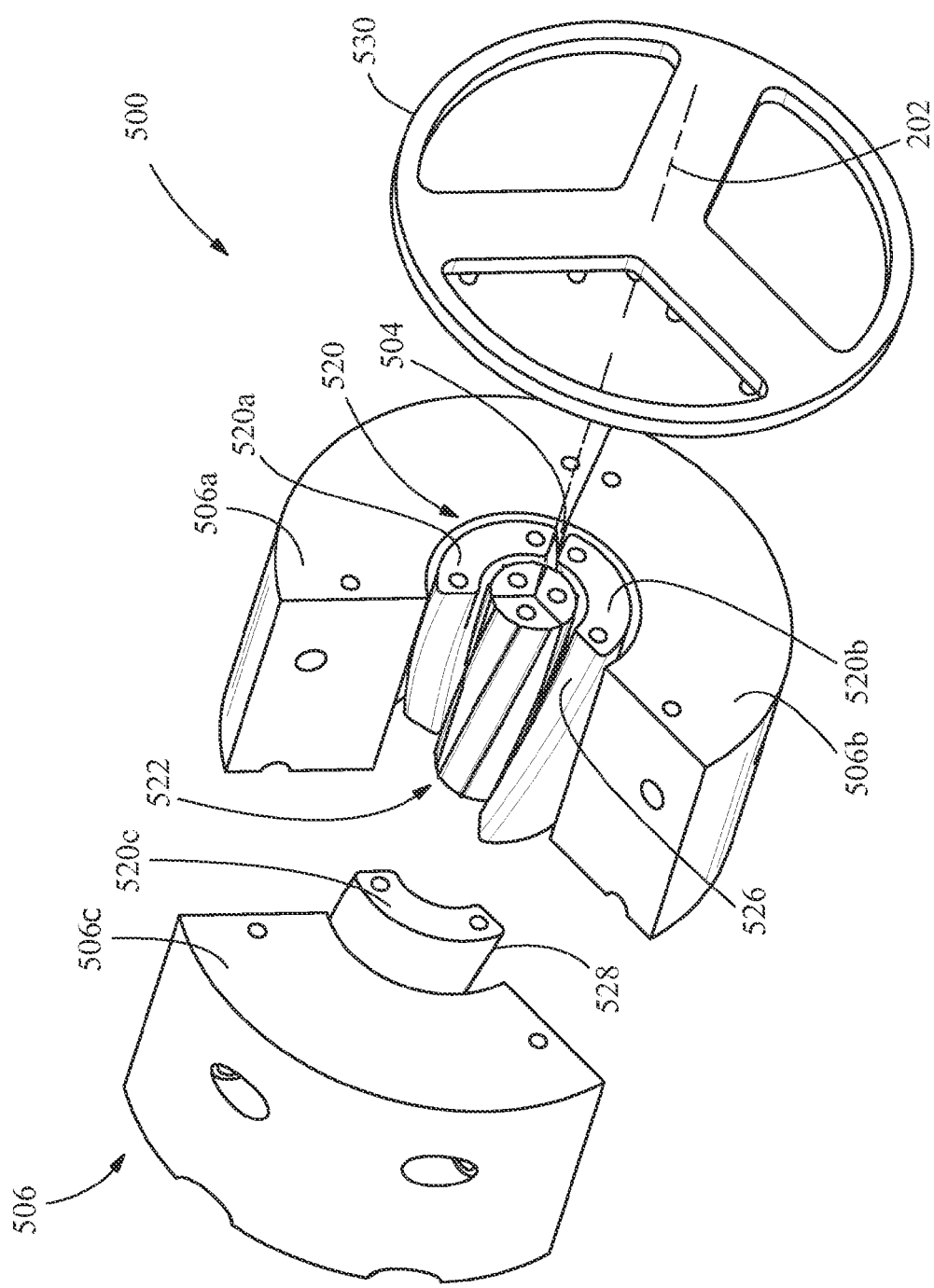
FIG. 35 shows an exploded view of the extrusion dies of FIG. 34.
Figure 36:
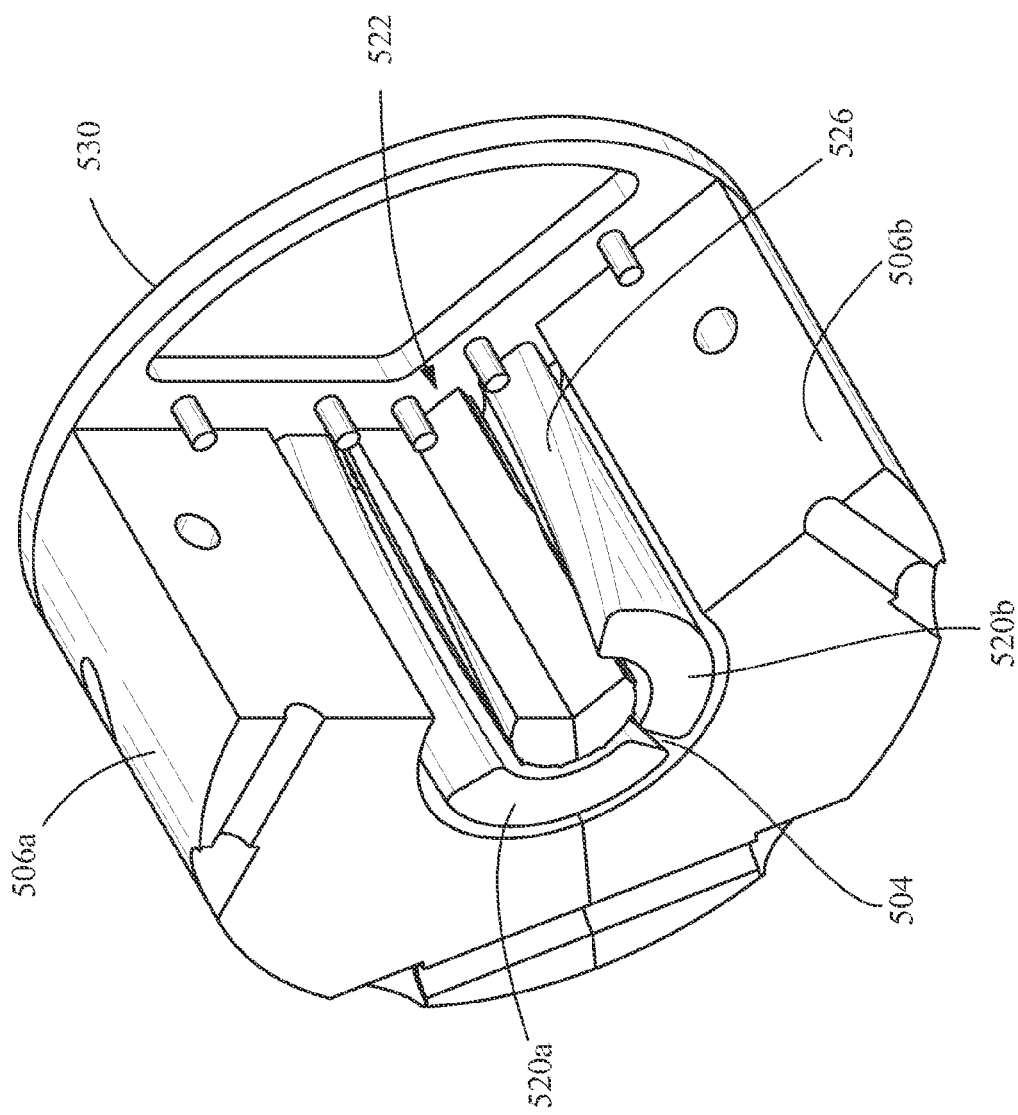
FIG. 36 shows a partial cutaway view of the extrusion dies of FIG. 34.

FIG. 27 shows a reverse, partial cutaway isometric view of extrusion dies of FIG. 25. Plastic state material will be forced into the dies via an extrusion process. For purposes of clarity as to the showing of the helical geometry associated with channels 504 of extrusion portions 525b between adjacent facing die portions 520a, 520b, 520c of die 520, the length of the die portions 520a, 520b, 520c incorporating the channels 504 is shown in FIG. 27 to be longer than the die 506 (die portions 506b, 506c of die 506 are shown in FIG. 27). FIG. 35 shows a partially exploded view of the dies 506, 522, with helical surface 526 of die portion 520b and helical surface 528 of die portion 520c defining facing surfaces of a corresponding helical channel 504 therebetween. FIG. 36 is a reverse partial cutaway view of FIG. 35, showing helical surface 526 of die portion 520b (die portion 520c is not shown and a portion of die 522 is shown removed in FIG. 35). As a result of channel 504, material to be extruded is directed to flow along the helical path defined between corresponding surfaces 526 and 528 (FIG. 35).

Figure 28B:
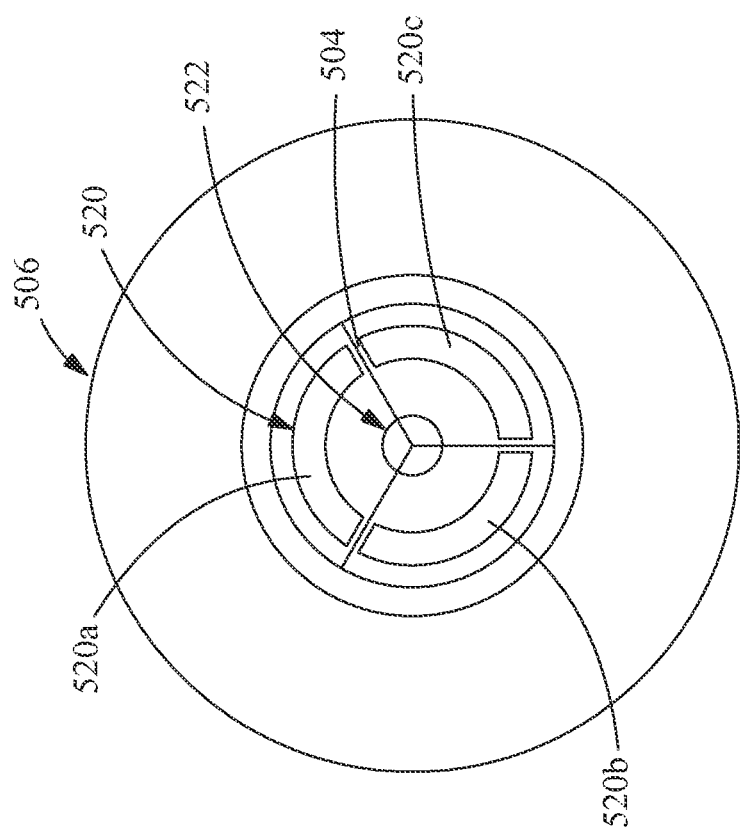
FIGS. 28A and 28B show opposed views corresponding to material entry and material exit of an apparatus for producing a multiwall tubular structure.
Figure 28A:
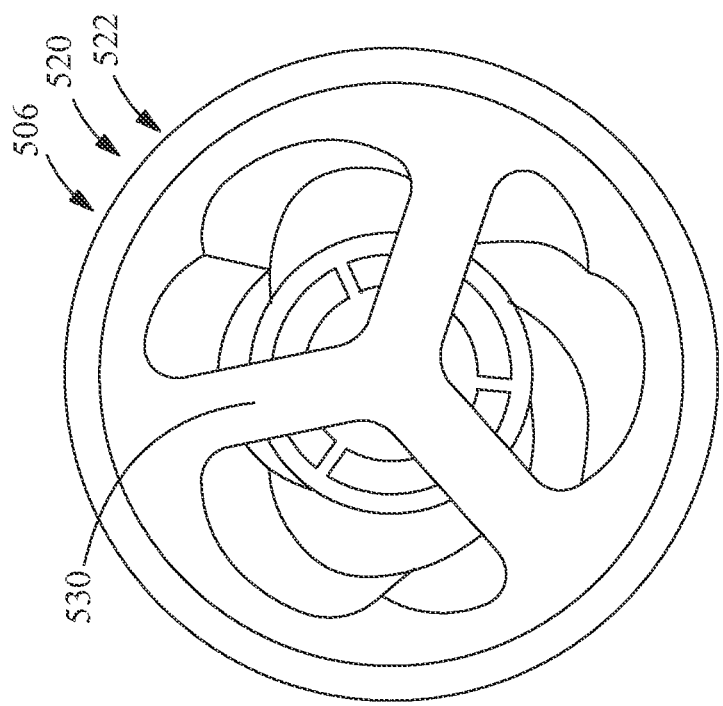

FIGS. 28A and 28B show respective entry and exit views of the sets of mandrels or dies 506, 520, 522. A splitter 530, which is usable to split billets or other materials, enables the material to flow more easily and evenly with less resistance through the mandrel or die as the material is extruded. The material is then funneled into the channels 504 machined into the die portions 520a, 520b, 520c of die 520 positioned between dies 522 and 506. Die 520 is split or divided into die portions 520a, 520b, 520c in such a way as to allow the die-maker the ability to machine the channels 504 of the mandrel such that the contoured channel surfaces are formed in more than one plane. Stated another way, the channel surfaces are nonplanar. This contoured nonplanar machining can be accomplished via multiple machining processes including, but not limited to, electrical discharge machining (EDM), hydraulics, computerized numerical control (CNC), or conventional milling. As shown in FIGS. 27 and 35, the resulting facing surfaces defining channels 504 between corresponding die portions 520a, 520b, 520c direct the plastic state material to flow between the nonplanar contours of the die channels and to move the material rotationally about longitudinal axis 202 of the die with the surface of the die and perpetuating this movement throughout the length of the extrusion dies. Perpetuation of such rotational movement of material is consistent with principles of fluid dynamics, with this rotational flow of material creating the internal helical formation.

While it may be possible to achieve an internally helical form using a die having a single channel, such as channel 604 of die 602 (FIG. 24), splitting or dividing the die 520 into a plurality of die portions, such as three die portions 520a, 520b, 520c (FIG. 27) provides additional structural strength and rigidity. In addition, use of a plurality of die portions, such as three die portions 520a, 520b, 520c with dies 506 and 522 of FIG. 35, has been successfully utilized to produce an extruded multiwall tubular structure simultaneously having a plurality (3) of internal helical forms, with the tubular structure also having a uniform outer surface, in which the internal helical forms, and the outer surface of the extruded multiwall tubular structure are simultaneously created by the novel die construction. Uniform outer surface, such as corresponding to the resulting extruded outline defined by the outer surface of extrusion outline 524 (FIG. 25), is intended to mean that outer wall "roundness" (for a structure having a circular extrusion portion 525a as shown in FIG. 25), uniform outer wall thickness and opposed outside surface distances (the diameter for extrusion outline 524) can be satisfactorily maintained.

FIG. 25 shows an embodiment in which the mandrel or die 520 is split or divided into three die portions 520a, 520b, 520c. This embodiment also shows machine surfaces that can be used for various purposes. For example, the channels 504 can be used to create gear teeth, heat transfer fins, bearing tracks, a sorting device, oil grooves or other application for helically extending feature. These features can also be used to create additional drag to create concentricity and uniformity for purposes of geometric stability of the outer tube corresponding to the cylinder and any internal ducting of extrusion outline 524. These machining surfaces can be included in one embodiment but are not necessary in other embodiments.

Figure 29:
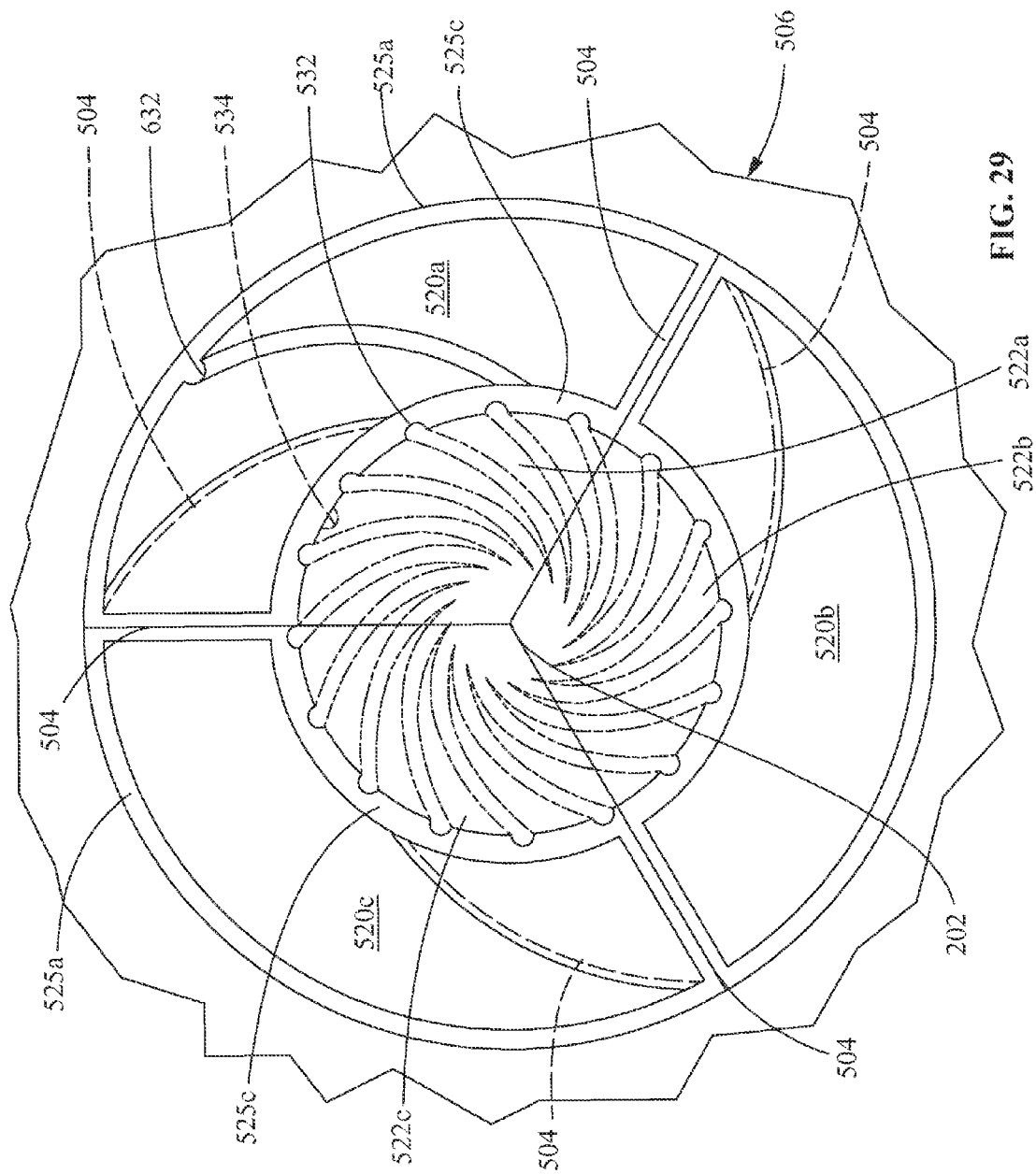
FIG. 29 shows an enlarged, partial elevation view of extrusion dies of FIG. 25.
Figure 30:
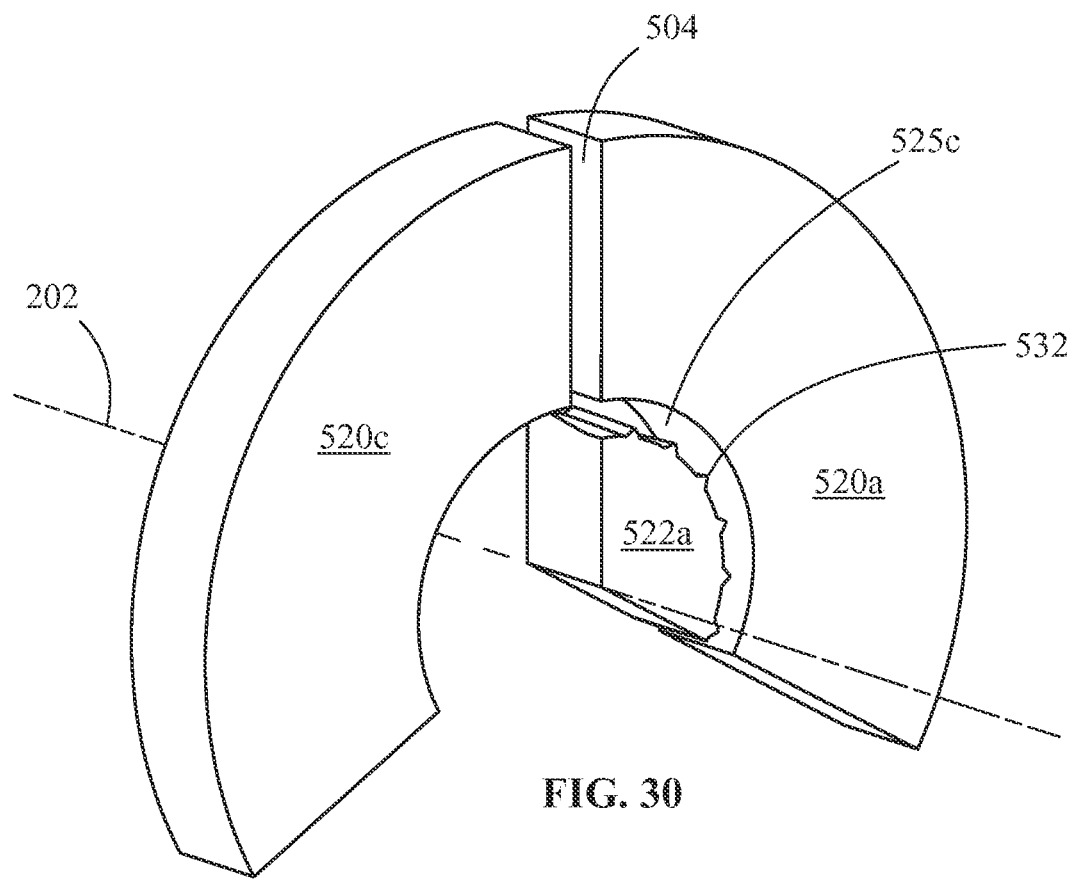
FIG. 30 shows a partial isometric view of extrusion dies for producing a multiwall tubular structure.
Figure 31:
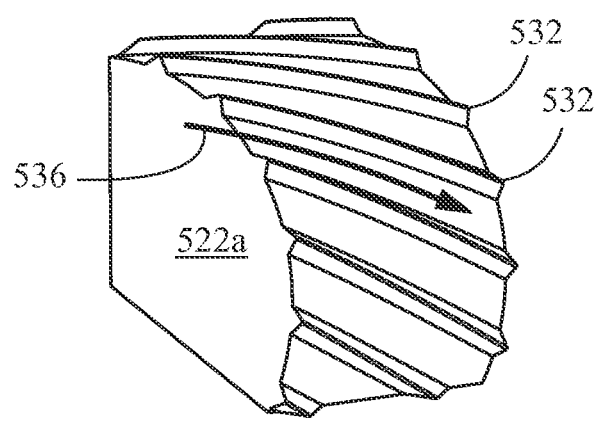
FIG. 31 shows a partial isometric view of an extrusion die of FIG. 30 showing flow of extrusion material.

FIGS. 29, 30 and 31 collectively, show another feature of extruder 501 that at least further improves the process for fabricating extruded multiwall tubular structures having internal helical forms. That is, while the nonplanar channels 504 such as between facing surfaces of die portions 520a, 520b, 520c can be used to create the internal helical forms, additional flow guiding or flow guidance features can be utilized to provide improved structures. For example, flow guiding or flow guidance features 532, such as protrusions extending radially outwardly along the peripheral surface of die 522 (specifically shown in die portion 522a in FIGS. 29, 30 and 31) facing die 520, or alternately as recessed flow guidance features 534 (FIG. 29). It is to be understood that different combinations of one or more recessed or protruding flow guidance features 532, 534 can be used in different embodiments. As yet further shown in FIGS. 30 and 31 (especially FIG. 31), plastic state material is urged in flow direction 536 between adjacent flow guidance features 532 between extrusion portion 525c defined between die portions 520a, 522a. In addition, flow guidance features 532 (and/or 534) are arranged to substantially align with helically extending channels 504 (relative to or about longitudinal axis 202) defined by facing surfaces of the die portions of die 520 (channel 504 formed by die portions 520a, 520c are shown in FIG. 30). As used herein, substantial alignment in the context of the channels and fluid guidance features is intended to mean the helix angle (as previously discussed) for each of the channels and fluid guidance features are substantially the same. In one embodiment, one or more of the guidance features can be arranged to be in radial alignment with a corresponding channel, although in another embodiment, one or more of the guidance features can be radially offset relative to the longitudinal axis.

One skilled in the art can appreciate that the flow guidance features are arranged to substantially align with channels 504 (FIG. 29) such that material flowing through extrusion portion 525a, 525b, 525c (FIG. 29) is urged to flow in flow direction 536 (FIG. 31). Optionally, in one embodiment, such as further shown in FIG. 29, die 520 has a flow guidance feature 632 (shown as a recess in FIG. 29, although in another embodiment, one or more features(s) can be protrusion(s)) formed therein to help guide flow through extrusion portion 525a. In one embodiment, flow guidance feature 632 is arranged to be substantially aligned with channels 504. Stated another way, as a result of one or more of helically directed channels 504 and/or flow guidance features 532 (and/or 534) and 632 (FIG. 29), extruded (plastic state) material flowing through the dies of the extrusion apparatus of the present application, such as a multiwall tubular structure having core 220, at least one form or arm 210 (three arms shown in FIG. 10) and outer wall 230 (FIG. 10) are collectively and simultaneously directed into uniform rotational movement about a longitudinal axis, such as longitudinal axis 202 as a result of the material flowing through the extrusion dies, the material last contacting the extrusion dies. That is, the structural components of the multiwall tubular structure (e.g., core 220, form or arm 210 and outer wall 230 of FIG. 10) as extruded by the extruder of the present application each have substantially the same helical angle relative to or about a longitudinal axis (longitudinal axis 202 in FIG. 10).

It is to be understood that for some materials, only one or more channels of the present application may be required to achieve multiwall tubular structure having internal helical form(s). In other embodiments, flow guidance features can be used in combination with the one or more channels for improved results, such as achieving one or more of more uniform wall thickness, more uniform outer dimensions, improved strength, reduced residual stresses during manufacture due to a lack of residual stresses associated with torsional and/or axial forces applied subsequent the structure exiting the extrusion dies of the present application and the like. The profile of the flow guidance features as well as the channels can employ a helix angle, as previously defined, that can range widely depending upon one of more of the material to be extruded, the application of use of the extruded material, the shape of the extrusion, the number and/or shape of the flow guidance features, the desired manufacturing feed rate, and other reasons contemplated by one having skill in the art of material extrusion.

It is to be understood that in one embodiment different materials can be directed into the extrusion dies, such as, for example, to provide different properties to different portions of the extruded structure.

Figure 32:
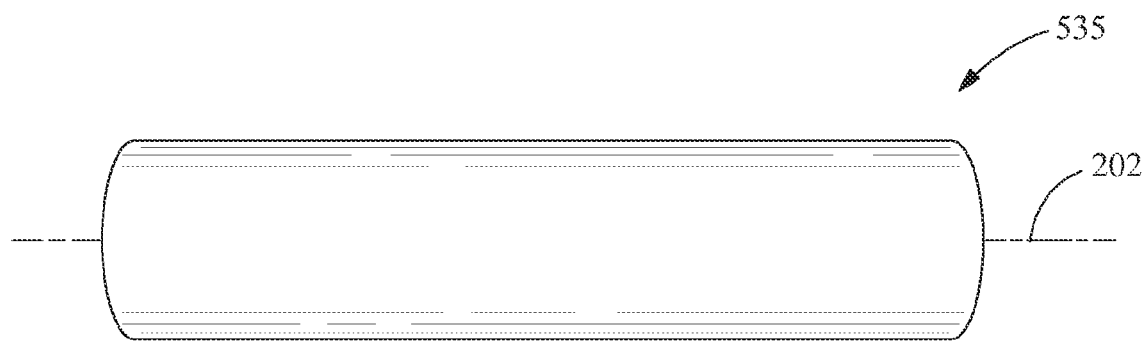
FIG. 32 shows an elevation view of an exemplary cylindrical multiwall tubular structure produced by an extrusion apparatus of the present disclosure.
Figure 33:
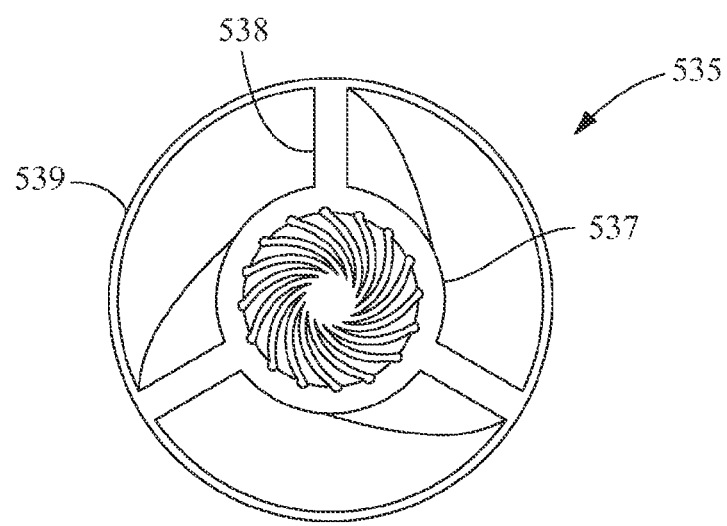
FIG. 33 shows an end view of the structure of FIG. 32.

FIGS. 32 and 33 show an exemplary embodiment of a finished product 536 defining a tube or cylinder having a circular core 537, an internal outwardly helically extending form 538 that extends between core 537 and a circular outer wall 539. Core 537 and outer wall 539 are concentric and centered about longitudinal axis 202. As described earlier and shown in FIGS. 26A-26E, the finished product can take on numerous geometries, including ribs and geometric shapes, and the rotation of the helix can be rotated in either a clockwise or counter-clockwise direction. Regardless of the finished appearance, the present application has provided for an internal helix to be constructed within a tube or cylinder in a single operation via an extrusion process.

In other words, apparatus of the present application can eliminate secondary operations, such as machining operations to form an internal helix within a tube or cylinder. Instead of a multi-stage process, an internal helix within a tube or cylinder can be extruded in a single pass, saving time, labor, and cost. While prototypes of the tooling have been generated and development is ongoing for further smoothing the external surface, the most difficult part, that is, extruding a plastic state material such that a tube or cylinder is formed with an internally developed helix without the need for a multi-stage process, has been achieved.

A further advantage of the extrusion apparatus, as previously discussed, is that the extruded tubular structure exiting the extruding apparatus, such as extrusion apparatus 500 (FIG. 24) of the present application requires no subsequent forming operations. Stated another way, the extrusion apparatus of the present application directs material flow such that for a multiwall tubular structure having a core having a longitudinal axis, an outer wall surrounding the core, and at least one form extending helically relative to the longitudinal axis and between the core and the outer wall in supporting relationship therewith formed by the extruder or extruder apparatus or apparatus of the present application, the at least one form and the outer wall of the structure exiting the extruder is last contacted by the dies of the extruder, requiring no additional processing to produce the structure.

There are ways to manufacture multiwall tubular structures with internal helical forms, but not in a single-stage or single pass process. For example, internal helixes can be created with a broach, cold form, drilling, CNC, milling, or other machining operations subsequent to a conventional extruder. As previously mentioned, injection molding, die casting, and investment casting may also be employed, but are limited based on size and material constraints and are highly cost prohibitive.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bridge for a conveyor system comprising:
   a bridge frame including a top support surface segment having a top support surface; the bridge frame further having first and second side walls extending downwardly away from the top support surface segment, each side wall having a portion thereof with a radius of curvature substantially matching a corresponding conveyor roller;
   wherein a portion of the first side wall extends toward and joins the second side wall, the second side wall further having a tail portion and a living hinge extending away from the tail portion.

2. The bridge of claim 1, wherein both the first side wall and the second side wall are joined to the top support surface segment.

3. The bridge of claim 1, further comprising an elastic bladder that forms at least a portion of a space providing an expandable brake chamber, such that a pressurized fluid introduced into the brake chamber causes the bladder to expand to provide a braking force to adjacent conveyor rollers.

4. The bridge of claim 3, wherein the elastic bladder is attached to the first side wall and the second side wall or the living hinge to form the brake chamber.

5. The bridge of claim 3, wherein the elastic bladder is attached to the first side wall and the living hinge to form the brake chamber.

6. The bridge of claim 3, wherein the elastic bladder is attached to the second side wall and the living hinge to form the brake chamber.

7. The bridge of claim 3, wherein the elastic bladder is attached to different portions of the first side wall to form the brake chamber.

8. The bridge of claim 1, wherein at least a portion of an upwardly facing surface of the top support surface segment has a nonslip feature incorporated thereon.

9. The bridge of claim 8, wherein the nonslip feature is a nonslip material incorporated thereon.

10. The bridge of claim 9, wherein the nonslip material is formed in a strip.

11. The bridge of claim 1, wherein at least the living hinge flexes during insertion of the bridge between adjacent conveyor rollers.

12. The bridge of claim 11, wherein the living hinge includes a notch formed therein to facilitate insertion of the bridge between adjacent conveyor rollers.

13. The bridge of claim 12, wherein the living hinge includes a protrusion formed therein to resist removal of the bridge after insertion of the bridge between adjacent conveyor rollers.

14. The bridge of claim 11, further comprising an axis extending through centers of adjacent parallel conveyor rollers, the axis coincident with a plane transverse to longitudinal axes of the adjacent parallel conveyor rollers, a first distance between intersection points of facing surface portions of the adjacent parallel conveyor rollers along the axis being less than a second distance between opposed ends of the top support surface segment (coincident with the plane), the first distance being less than a third distance between a distal end of the tail portion (coincident with the plane) and a distal end of the living hinge (coincident with the plane) so as to resist removal of the bridge after insertion of the bridge between the adjacent parallel conveyor rollers.

15. The bridge of claim 1, wherein the bridge is positioned such that the first side wall and the second side wall are substantially maintained in a non-contacting position relative to corresponding conveyor rollers.

16. The bridge of claim 3, further comprising caps sealed to opposed ends of the brake chamber.

17. The bridge of claim 16, further comprising a conduit in fluid communication with the brake chamber and a source of pressurized fluid.

18. The bridge of claim 17, wherein fluid communication between the conduit and at least one other brake chamber is maintained in at least one of in series and in parallel.

19. The bridge of claim 18, wherein the caps are configured to receive the conduit and interconnect other brake chambers in at least one of in series or in parallel.

20. A bridge for a conveyor system comprising:
- a bridge frame including a top support surface segment having a top support surface, the bridge frame further including first and second side walls extending downwardly away from the top support surface segment, each side wall having a portion thereof with a radius of curvature substantially matching a corresponding conveyor roller; and
- an elastic bladder that forms at least a portion of a space providing an expandable brake chamber, such that a pressurized fluid introduced into the brake chamber causes the bladder to expand to provide a braking force to adjacent conveyor rollers;
- wherein a portion of the first side wall extends toward and joins the second side wall, the second side wall further having a tail portion and a living hinge extending away from the tail portion.

* * * * *